(12) United States Patent
Roh et al.

(10) Patent No.: US 12,729,134 B2
(45) Date of Patent: Sep. 8, 2026

(54) LITHIUM TRANSITION METAL OXIDE, POSITIVE ELECTRODE ADDITIVE FOR LITHIUM SECONDARY BATTERY, AND LITHIUM SECONDARY BATTERY COMPRISING THE SAME

(71) Applicant: LG Chem, Ltd., Seoul (KR)

(72) Inventors: Jongmin Roh, Daejeon (KR); Seokhyun Yoon, Daejeon (KR); Yoon Jae Lee, Daejeon (KR); Donghoon Suh, Daejeon (KR)

(73) Assignee: LG Chem, Ltd., Seoul (KR)

( * ) Notice: Subject to any disclaimer, the term of this patent is extended or adjusted under 35 U.S.C. 154(b) by 896 days.

(21) Appl. No.: 17/801,981

(22) PCT Filed: Aug. 17, 2021

(86) PCT No.: PCT/KR2021/010895
§ 371 (c)(1),
(2) Date: Aug. 24, 2022

(87) PCT Pub. No.: WO2022/158670
PCT Pub. Date: Jul. 28, 2022

(65) Prior Publication Data

US 2023/0148262 A1 May 11, 2023

(30) Foreign Application Priority Data

Jan. 22, 2021 (KR) ........................ 10-2021-0009337
Aug. 12, 2021 (KR) ........................ 10-2021-0106774
(Continued)

(51) Int. Cl.
*C01G 51/82* (2025.01)
*C01G 51/42* (2025.01)
(Continued)

(52) U.S. Cl.
CPC ............. *C01G 51/82* (2025.01); *C01G 51/42* (2013.01); *H01M 4/628* (2013.01);
(Continued)

(58) Field of Classification Search
CPC ....... C01G 51/82; C01G 51/42; H01M 4/628; H01M 10/052; H01M 50/46;
(Continued)

(56) References Cited

U.S. PATENT DOCUMENTS

2008/0160414 A1 7/2008 Jitsugiri et al.
2013/0171524 A1* 7/2013 Cho ...................... H01M 4/485
429/223
(Continued)

FOREIGN PATENT DOCUMENTS

CN 1893151 A 1/2007
CN 105940528 A 9/2016
(Continued)

OTHER PUBLICATIONS

Yuntao Guo, Xinhai Li, Zhixing Wang, Huajun Guo, Jiexi Wang, Bifunctional Li6Co04 serving as prelithiation reagent and pseudocapacitive electrode for lithium ion capacitors, Journal of Energy Chemistry, vol. 47, (Year: 2020).*
(Continued)

*Primary Examiner* — Nicholas A Smith
*Assistant Examiner* — Seamus Patrick McNulty
(74) *Attorney, Agent, or Firm* — Lerner David LLP

(57) ABSTRACT

A lithium transition metal oxide capable of minimizing a side reaction with an electrolyte, thereby suppressing the generation of gas during charging and discharging of a lithium secondary battery is provided. A lithium transition metal oxide is represented by Chemical Formula 1, wherein a lattice parameter of a unit lattice satisfies Equations 1 and
(Continued)

2. A positive electrode additive for a lithium secondary battery, and a lithium secondary battery are also provided.

13 Claims, 3 Drawing Sheets

(30) Foreign Application Priority Data

Aug. 12, 2021 (KR) ........................ 10-2021-0106775
Aug. 12, 2021 (KR) ........................ 10-2021-0106776

(51) Int. Cl.
*H01M 4/02* (2006.01)
*H01M 4/62* (2006.01)
*H01M 10/052* (2010.01)
*H01M 50/46* (2021.01)

(52) U.S. Cl.
CPC ......... *H01M 10/052* (2013.01); *H01M 50/46* (2021.01); *C01P 2002/54* (2013.01); *C01P 2004/61* (2013.01); *C01P 2006/40* (2013.01); *H01M 2004/028* (2013.01)

(58) Field of Classification Search
CPC .. H01M 2004/028; H01M 4/382; H01M 4/48; C01P 2002/54
See application file for complete search history.

(56) References Cited

U.S. PATENT DOCUMENTS

| | | | |
|---|---|---|---|
| 2014/0087262 A1 | 3/2014 | Imahashi et al. | |
| 2015/0372304 A1 | 12/2015 | Tasegawa et al. | |
| 2016/0351905 A1 * | 12/2016 | Kawamura | H01M 10/0525 |
| 2019/0036117 A1 | 1/2019 | Liu | |
| 2019/0181445 A1 | 6/2019 | Lee et al. | |
| 2020/0161643 A1 | 5/2020 | Chang et al. | |
| 2021/0408538 A1 | 12/2021 | Aoki et al. | |
| 2022/0181627 A1 | 6/2022 | Park et al. | |

FOREIGN PATENT DOCUMENTS

| | | | |
|---|---|---|---|
| CN | 108199035 | A | 6/2018 |
| CN | 108807860 | A | 11/2018 |
| CN | 109309227 | A | 2/2019 |
| CN | 109713238 | A | 5/2019 |
| CN | 110224114 | A | 9/2019 |
| CN | 111162258 | A | 5/2020 |
| JP | 2003068302 | A | 3/2003 |
| JP | 2005026141 | A | 1/2005 |
| JP | 3685109 | B2 | 8/2005 |
| JP | 2008153017 | A | 7/2008 |
| JP | 2012230898 | A | 11/2012 |
| JP | 2012253009 | A | 12/2012 |
| JP | 2013-118067 | A | 6/2013 |
| JP | WO2014118834 | A1 | 1/2017 |
| JP | WO2015115052 | A1 | 3/2017 |
| JP | 2018095529 | A | 6/2018 |
| JP | 2019061750 | A | 4/2019 |
| JP | 2020123460 | A | 8/2020 |
| KR | 20130079109 | A | 7/2013 |
| KR | 20150101181 | A | 9/2015 |
| KR | 101751213 | B1 | 6/2017 |
| KR | 20190059115 | A | 5/2019 |
| KR | 20190064424 | A | 6/2019 |
| KR | 20200066048 | A | 6/2020 |
| WO | 2007102407 | A1 | 9/2007 |
| WO | 2015115052 | A1 | 8/2015 |
| WO | 2018048155 | A1 | 3/2018 |
| WO | 2020110590 | A1 | 6/2020 |

OTHER PUBLICATIONS

Jie-Nan Zhang et al. Chinese Phys. B 27 088202 (Year: 2018).*
Zhang, Zhifeng, “The research of structure and doping for Li-ion In battery 3D cathode material”, Ningbo Institute of Materials Technology & Engineering Chinese Academy of Sciences, Apr. 2017. 22 pgs.
Extended European Search Report for Application No. 21920110.0 dated Aug. 3, 2023. 7 pgs.
Extended European Search Report for Application No. 21920100.1 dated Aug. 3, 2023. 7 pgs.
Extended European Search Report for Application No. 21920099.5 dated Aug. 3, 2023. 7 pgs.
Noh, Mijung and Cho, Jaephil , “Role of Li6Co04 Cathode Additive in Li-Ion Cells Containing Low Coulombic Efficiency Anode Material” , Journal of The Electrochemical Society , Jul. 20, 2012 , vol. 159, No. 8 , A1329-A1334. 6 pages.
International Search Report for Application No. PCT/KR2021/010895 mailed Dec. 6, 2021, 2 pages.
International Search Report for Application No. PCT/KR2021/010896 mailed Dec. 1, 2021, 3 pages.
International Search Report for Application No. PCT/KR2021/010899 mailed Dec. 1, 2021, 3 pages.

* cited by examiner

【FIG. 1】
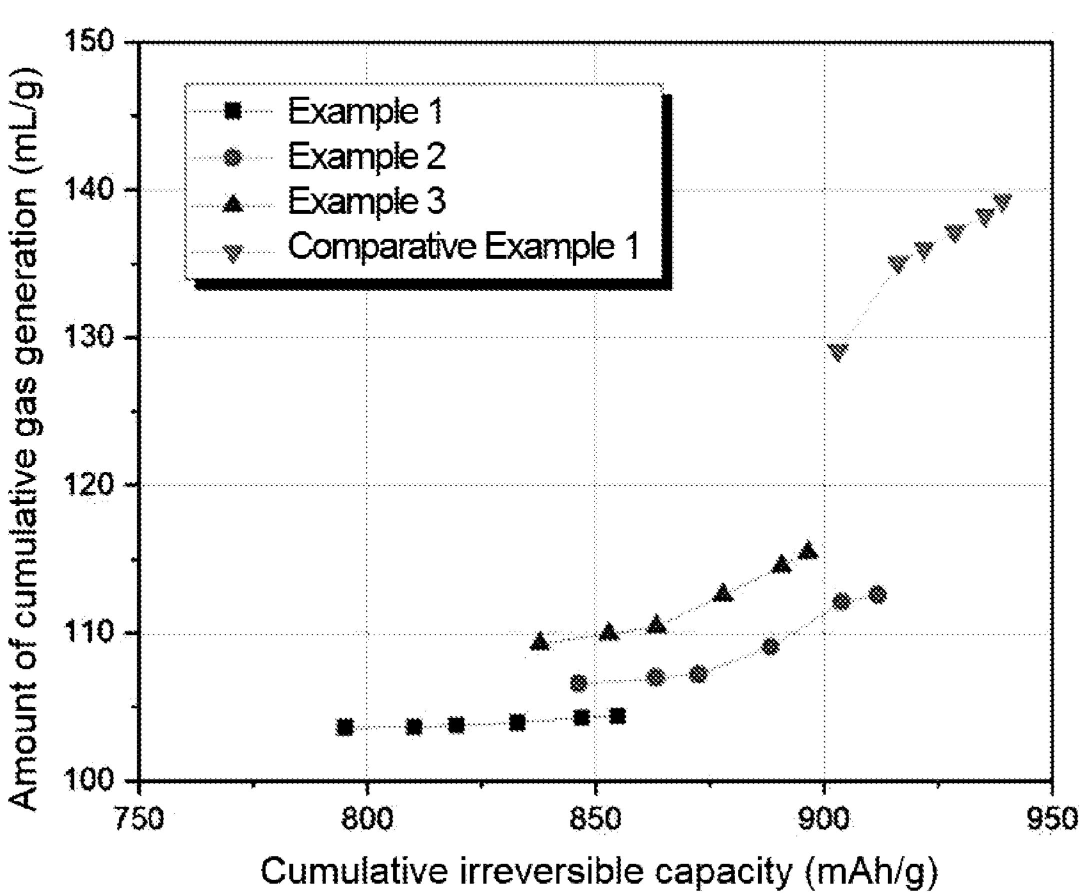

【FIG. 2】
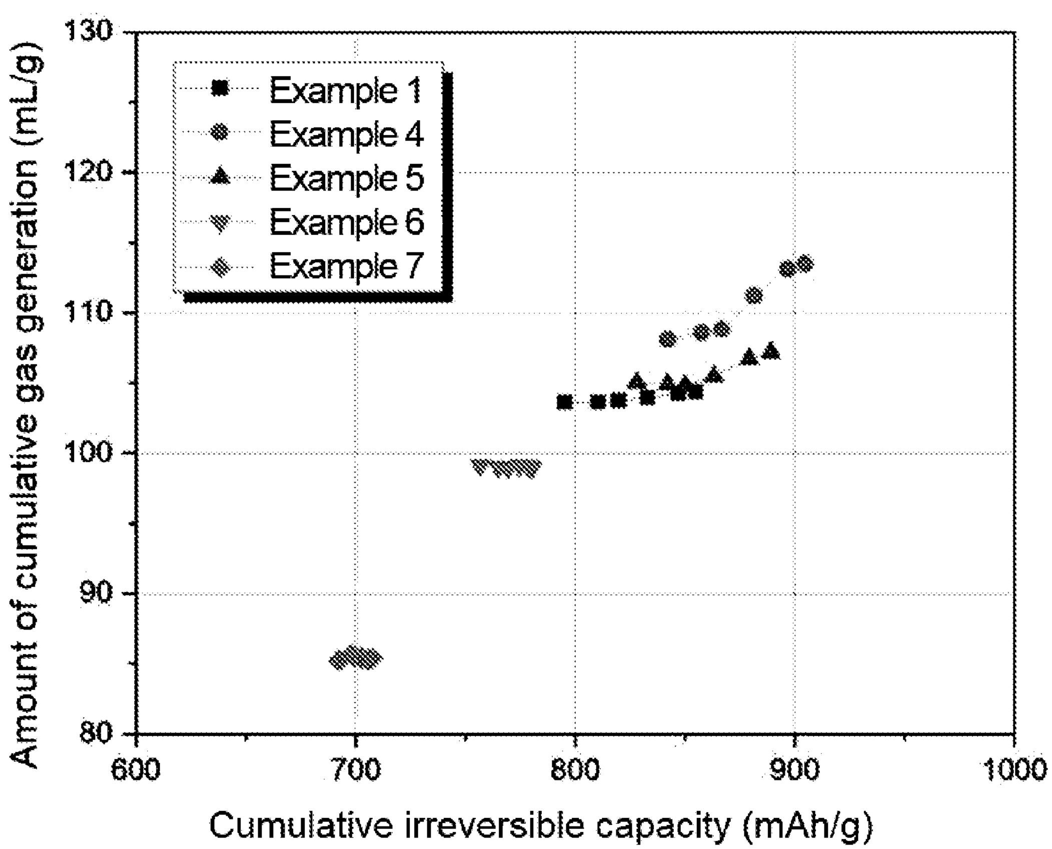

【FIG. 3】
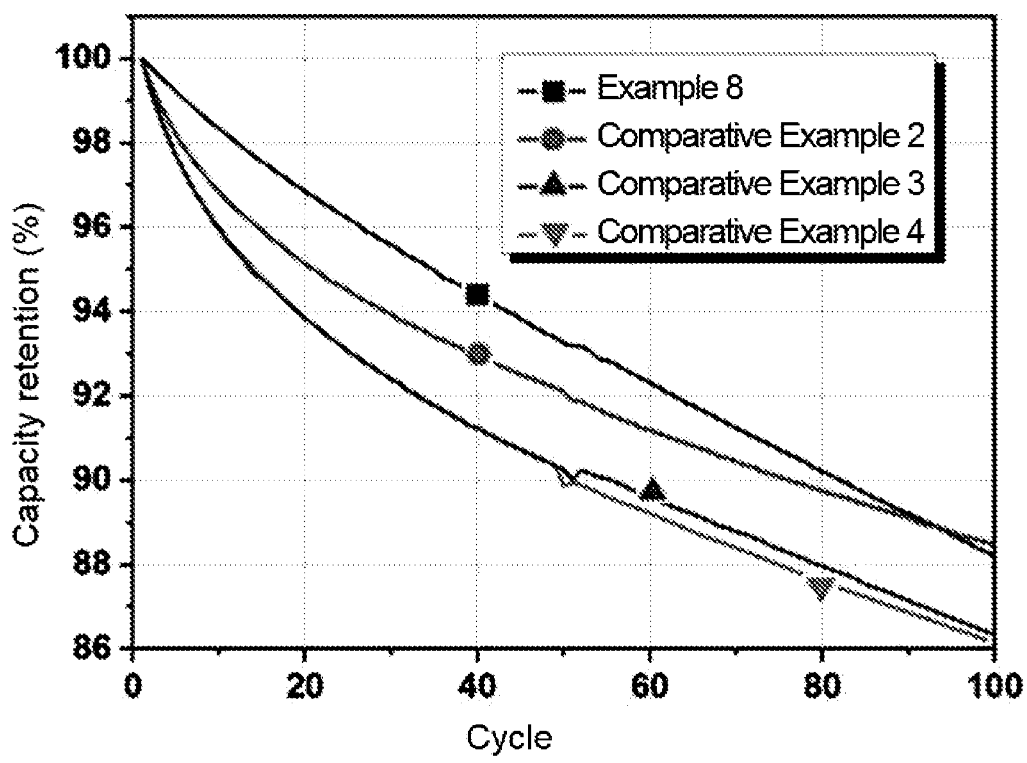

LITHIUM TRANSITION METAL OXIDE, POSITIVE ELECTRODE ADDITIVE FOR LITHIUM SECONDARY BATTERY, AND LITHIUM SECONDARY BATTERY COMPRISING THE SAME

CROSS-REFERENCE TO RELATED APPLICATIONS

This application is a national phase entry under 35 U.S.C. § 371 of International Application No. PCT/KR2021/010895, filed on Aug. 17, 2021, which claims the benefits of Korean Patent Applications No. 10-2021-0009337 filed on Jan. 22, 2021, No. 10-2021-0106774 filed on Aug. 12, 2021, No. 10-2021-0106775 on Aug. 12, 2021, and No. 10-2021-0106776 filed on Aug. 12, 2021 with the Korean Intellectual Property Office, the disclosures of which are incorporated herein by reference in its entirety.

TECHNICAL FIELD

The present disclosure relates to a lithium transition metal oxide, a positive electrode additive for a lithium secondary battery, and a lithium secondary battery including the same.

BACKGROUND OF ART

As power consumption increases with the multifunctionalization of electronic devices, many attempts have been made to increase the capacity of a lithium secondary battery and improve charge/discharge efficiency thereof.

As one example, there has been a proposal for a technique, in which a positive electrode active material of at least 80% Ni is applied to a positive electrode of a lithium secondary battery as a positive electrode material, and a metal or metal-based negative electrode active material such as SiO, Si or SiC is applied to a negative electrode along with a carbon-based negative electrode active material such as natural graphite, artificial graphite or the like.

The metal and metal oxide-based negative electrode active material enables a higher capacity than the carbon-based negative electrode active material. However, in the case of the metal and metal oxide-based negative electrode active material, a volume change during charging and discharging is much larger than that of graphite, and thus it is difficult to increase the content of metals and metal oxides in the negative electrode to 15% or more. In addition, when the metals and metal oxides are added into the negative electrode, an irreversible reaction occurs in the initial charge and discharge, and thus the loss of lithium is larger than when a carbon-based negative electrode active material is applied. Thus, when the metal and metal oxide-based negative electrode active material is applied, the amount of lithium lost increases as the capacity of the battery increases, and thus a degree of decrease in the initial capacity also increases.

Accordingly, a study has been conducted on various methods for increasing the capacity of the lithium secondary battery or reducing the irreversible capacity. One of the methods is prelithiation, which is a concept of replenishing lithium consumed in the formation of a solid electrolyte interphase (SEI) layer in an initial state in the battery.

Various methods have been proposed for prelithiation in the battery.

As one example, there is a method of electrochemically lithiating the negative electrode before driving the battery. However, the lithiated negative electrode is very unstable in the atmosphere, and the electrochemical lithiation method is difficult to scale-up the process.

As another example, there is a method of coating the negative electrode with lithium metal or lithium silicide (LixSi) powder. However, the powder has low atmospheric stability due to high reactivity, and thus causing a problem in that it is difficult to establish a suitable solvent and process conditions when coating the negative electrode.

As a prelithiation method in the positive electrode, there is a method of coating with the positive electrode material as much as the amount of lithium consumed in the negative electrode. However, due to the low capacity of the positive electrode material per se, the amount of the added positive electrode material increases, and the energy density and capacity per weight of the final battery decrease as much as the amount of the increased positive electrode material.

Accordingly, a material suitable for prelithiation of the battery in the positive electrode needs to have an irreversible property in which lithium is desorbed at least twice as much as that of a conventional positive electrode material during initial charge of the battery and the material does not react with lithium during subsequent discharge. An additive satisfying the above conditions is referred to as sacrificial positive electrode materials.

A commercial battery is subjected to a formation process in which an electrolyte is injected into a case including a stacked positive electrode, a separator, and a negative electrode, and then a charge/discharge operation is performed for the first time. In this process, an SEI layer formation reaction occurs on the negative electrode, and gas is generated due to the decomposition of the electrolyte. In the formation process, the sacrificial positive electrode material reacts with the electrolyte while releasing lithium and decomposing, and gases such as $N_2$, $O_2$, $CO_2$, etc., generated in the process are recovered through a gas pocket removal process.

As the sacrificial positive electrode material, over-lithiated positive electrode materials, which are lithium-rich metal oxides, are widely used. As the over-lithiated positive electrode materials, $Li_6CoO_4$, $Li_5FeO_4$, $Li_6MnO_4$ and the like, which have an anti-fluorite structure, are well known. In terms of a theoretical capacity, $Li_6CoO_4$ has 977 mAh/g, $Li_5FeO_4$ has 867 mAh/g, and $Li_6MnO_4$ has 1001 mAh/g, which are sufficient for use as a sacrificial positive electrode material. Among the above, $Li_6CoO_4$ has the most excellent electrical conductivity and thus has good electrochemical properties for use as a sacrificial positive electrode material.

$Li_6CoO_4$ is desorbed and decomposed step by step in the formation process, and a crystal phase collapses, and thus $O_2$ gas is inevitably generated in this process. Ideally, $Li_6CoO_4$ should not generate additional gas during the charge/discharge cycle after the formation process. If gas is continuously generated during charging and discharging, the pressure inside the battery increases, and thus a distance between the electrodes may increase and the battery capacity and energy density may decrease. In a severe case, the battery cannot withstand the pressure and may result in an explosion accident.

Thus, there is a need to develop a technology capable of inactivating or stabilizing the final crystal phase of $Li_6CoO_4$ in order not to have an electrochemical activity so that additional gas is not generated during the charge/discharge cycle.

PRIOR ART DOCUMENTS (Patent Document 1) Republic of Korea Patent Publication No. 10-2013-0079109 (2013 Jul. 10)

(Patent Document 2) Republic of Korea Patent Publication No. 10-2020-0066048 (2020 Jun. 9)

DETAILED DESCRIPTION OF THE INVENTION

Technical Problem

There is provided a lithium transition metal oxide capable of suppressing a side reaction with an electrolyte, thereby reducing the generation of gas in a positive electrode of a lithium secondary battery.

In the present disclosure, there is provided a method for preparing the lithium transition metal oxide.

In the present disclosure, there is provided a positive electrode additive for a lithium secondary battery including the lithium transition metal oxide.

In the present disclosure, there is provided a positive electrode for a lithium secondary battery including the lithium transition metal oxide.

In the present disclosure, there is provided a positive electrode for a lithium secondary battery including the positive electrode additive for a lithium secondary battery.

In the present disclosure, there is provided a lithium secondary battery including the positive electrode for a lithium secondary battery.

Technical Solution

According to an embodiment of the present disclosure, there is provided a lithium transition metal oxide represented by the following Chemical Formula 1, wherein a lattice parameter of a unit lattice satisfies the following Equations 1 and 2:

[Chemical Formula 1]

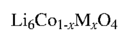

in Chemical Formula 1,

M is at least one element selected from the group consisting of a group 2 element, a group 13 element, a group 14 element, a 4th period transition metal, a 5th period transition metal, and a 6th period transition metal, and x is 0.05 to 0.80;

$$6.53200\ Å \le a = b \le 6.54400\ Å \quad \text{[Equation 1]}$$

$$4.64930\ Å \le c \le 4.65330\ Å \quad \text{[Equation 2]}$$

in Equations 1 and 2, a, b and c are lattice parameters of the lithium transition metal oxide obtained by an XRD Rietveld refinement method using CuKα rays.

According to another embodiment of the present disclosure, there is provided a method for preparing the lithium transition metal oxide including:

a first step of obtaining a raw material mixture by solid-state mixing of lithium oxide, cobalt oxide and hetero-element (M) oxide; and a second step of obtaining a compound represented by the following Chemical Formula 1 by calcining the mixture obtained in the first step under an inert atmosphere and at a temperature of 550° C. to 750° C.

According to another embodiment of the present disclosure, there is provided a positive electrode additive for a lithium secondary battery including the lithium transition metal oxide.

According to another embodiment of the present disclosure, there is provided a positive electrode for a lithium secondary battery including a positive electrode active material, a binder, a conductive material, and the lithium transition metal oxide.

According to another embodiment of the present disclosure, there is provided a positive electrode for a lithium secondary battery including a positive electrode active material, a binder, a conductive material, and the positive electrode additive for the lithium secondary battery.

According to another embodiment of the present disclosure, there is provided a lithium secondary battery including the positive electrode for the lithium secondary battery; a negative electrode; a separator; and an electrolyte.

Hereinafter, the lithium transition metal oxide, the method for preparing the lithium transition metal oxide, the positive electrode additive for the lithium secondary battery, the positive electrode for the lithium secondary battery, and the lithium secondary battery according to embodiments of the present invention will be described in more detail.

The terms or words used in the present disclosure and claims should not be construed as being limited to their ordinary or dictionary meanings and should be interpreted as a meaning and concept consistent with the technical idea of the invention based on the principle that the inventors may properly define the concept of the terms in order to best describe their own inventions.

Unless otherwise defined in the present disclosure, all technical and scientific terms have the same meaning as commonly understood by those skilled in the art to which the present invention pertains. The terms used in the description of the present invention is intended for the purpose of effectively describing particular embodiments only and is not intended to limit the present invention.

Singular expressions of the present disclosure may include plural expressions unless they are differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, components and/or groups.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

In the present disclosure, when a positional relationship of two parts is described as, for example, "on ~", "at an upper part of ~", "at a lower part of ~", "next to ~", etc., one or more other parts may be placed between the two parts unless an expression of "immediately" or "directly' is used.

In the present disclosure, when a temporal relationship is described as, for example, "after ~", "following ~", "subsequent to ~", "before ~", etc., cases in which events are not continuous may be included, unless an expression of "immediately" or "directly' is used.

In the present disclosure, it should be understood that the term "at least one" includes all possible combinations from one or more related items.

As used herein, the term "positive electrode additive" may refer to a material having an irreversible property in which lithium is desorbed at least twice as much as that of a conventional positive electrode material during initial charge of the battery and the material does not react with lithium during subsequent discharge. The positive electrode additive may be referred to as sacrificial positive electrode materials. Since the positive electrode additive compensates for the loss of lithium, as a result, the capacity of the battery may be increased by restoring the lost capacity of the battery, and the gas generation may be suppressed to prevent the battery from exploding, thereby improving lifespan and safety of the battery.

As used herein, the term "stabilization of a crystal phase" may refer to suppressing the oxidative property of amorphous $CoO_2$ that occurs after initial charge of a lithium secondary battery including a lithium cobalt oxide-based positive electrode additive into which a hetero-element is introduced. By suppressing the oxidative property of the amorphous $CoO_2$, a side reaction between $CoO_2$ and electrolyte may be prevented to suppress the generation of gas.

I. Lithium Transition Metal Oxide

According to an embodiment of the present disclosure, there is provided a lithium transition metal oxide represented by the following Chemical Formula 1, wherein a lattice parameter of a unit lattice satisfies the following Equations 1 and 2:

[Chemical Formula 1]

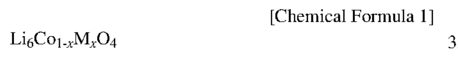

$Li_6Co_{1-x}M_xO_4$ in Chemical Formula 1,

M is at least one element selected from the group consisting of a group 2 element, a group 13 element, a group 14 element, a 4th period transition metal, a 5th period transition metal, and a 6th period transition metal, and x is 0.05 to 0.80;

$$6.53200\ \text{Å} \leq a = b \leq 6.54400\ \text{Å} \quad \text{[Equation 1]}$$

$$4.64930\ \text{Å} \leq c \leq 4.65330\ \text{Å} \quad \text{[Equation 2]}$$

in Equations 1 and 2, a, b and c are lattice parameters of the lithium transition metal oxide obtained by an XRD Rietveld refinement method using CuKα rays.

As a result of continuous research by the present inventors, it has been confirmed that a lithium transition metal oxide represented by the Chemical Formula 1 and satisfying the Equations 1 and 2 minimizes a side reaction with an electrolyte to suppress the generation of gas at a positive electrode during charging and discharging of a lithium secondary battery. This is probably because a more stable crystal phase is maintained by satisfying a lattice parameter in a specific range along with the introduction of a hetero-element (M) into the lithium transition metal oxide. Accordingly, the lithium transition metal oxide enables the improvement of safety and lifespan of a lithium secondary battery.

Since the lithium transition metal oxide is represented by the Chemical Formula 1 and satisfies above Equations 1 and 2, it is possible to stabilize the crystal phase compared to lithium cobalt oxide such as $Li_6CoO_4$. In the present disclosure, the stabilization of the crystal phase refers to suppressing the oxidative property of amorphous $CoO_2$ formed after initial charge of the lithium secondary battery including the lithium cobalt oxide.

In this regard, when the crystal phase of an electrode is checked through X-ray diffraction (XRD) after fully charging the lithium secondary battery including $Li_6CoO_4$, no amorphous pattern tends to appear. In a formation process, in the case of $Li_6CoO_4$, $Co^{2+}$ cations are initially oxidized into $Co^{4+}$ cations, and then $O^{2-}$ anions are oxidized to generate gas. When the charge is completed, a composition of $CoO_2(Co^{4+})$ is obtained without crystallinity, and thus no pattern is observed.

The $Co^{4+}$ cations have a large oxidative property, which is a tendency of $Co^{4+}$ cations to be reduced to $Co^{2+}$ cations or $Co^{3+}$ cations as it is or during discharge (reduction reaction), and thus a side reaction may occur while oxidizing the electrolyte around. Electrolytes such as carbonates are decomposed by the side reaction so as to generate gases such as $CO_2$, CO, and $H_2$. When the charge/discharge cycle proceeds, $Co^{2+}$ cations or $Co^{3+}$ cations, which have been reduced during charge, are oxidized to $Co^{4+}$ cations and the $Co^{4+}$ cations are reduced back to $Co^{2+}$ cations or $Co^{3+}$ cations during discharge, such that gas is continuously generated by the side reaction.

In order to suppress the side reaction, it is necessary to suppress the oxidative property, which is a tendency of $Co^{4+}$ cations to be reduced. For example, there may be a method of stabilizing the oxidation number of $Co^{4+}$ cations by introducing a hetero-element.

In the Chemical Formula 1, a hetero-element (M) has a fixed oxidation number during charging and discharging of the battery, and thus an effect of lowering an average oxidation number of $Co^{4+}$ cations may be expected. Accordingly, the oxidative property of $Co^{4+}$ cations may be suppressed, and generation of gas caused by the side reaction may be suppressed. In particular, the lithium transition metal oxide may have a lattice parameter satisfying above Equations 1 and 2, and thus a more stabilized crystal phase may be maintained during charging and discharging of a lithium secondary battery.

The lithium transition metal oxide represented by the Chemical Formula 1 has a composition in which a hetero-element (M) is alloyed or doped into $Li_6CoO_4$.

Herein, the "alloy" means that the hetero-element (M) is introduced in an amount of 10 mol % or more based on the total metal elements excluding lithium in the lithium transition metal oxide. In addition, the "doping" means that the hetero-element (M) is introduced in an amount of less than 10 mol % based on the total metal elements excluding lithium in the lithium transition metal oxide.

In the Chemical Formula 1, the hetero-element (M) is at least one element selected from the group consisting of a group 2 element, a group 13 element, a group 14 element, a 4th period transition metal, a 5th period transition metal, and a 6th period transition metal.

Specifically, the group 2 element includes at least one selected from the group consisting of Mg, Ca, Sr and Ba; the group 13 element includes at least one selected from the group consisting of Al, Ga and In; the group 14 element includes at least one selected from the group consisting of Si, Ge and Sn; the 4th period transition metal includes at least one selected from the group consisting of Sc, Ti, V, Cr, Mn, Fe, Co, Ni, Cu and Zn; the 5th period transition metal includes at least one selected from the group consisting of Y, Zr, Nb, Mo, Tc, Ru, Rh, Pd, Ag and Cd; and the 6th period transition metal includes at least one selected from the group consisting of Lu, Hf, Ta, W, Re, Os, Ir, Pt and Au.

Preferably, in terms of ease of alloying or doping with lithium cobalt oxide and stabilization of the crystal phase, the M may be at least one element selected from the group consisting of Zn, Al, Mg, Ti, Zr, Nb and W. Zn, Al, Mg, Ti, Zr, Nb and W may be well substituted at Co sites in the anti-fluorite lattice structure, which is a crystal phase of $Li_6CoO_4$, and the oxidation numbers per se may not change. For example, Zn may have a $Li_6ZnO_4$ crystal phase and easily form an alloy with $Li_6CoO_4$, and an oxidation number thereof may not change from 2+, thereby effectively suppressing the oxidative property of $Co^{4+}$ cations after initial charge.

More preferably, the M may be at least one element selected from the group consisting of Zn, Al and Mg. Even more preferably, the M may be Zn.

The hetero-element (M) may be selected in consideration of whether the M may exist in the anti-fluorite lattice structure of lithium cobalt oxide and whether the M has a fixed oxidation number during charging and discharging of the battery.

For example, in the case of $Li_5FeO_4$ and $Li_6MnO_4$ that do not satisfy the composition of the Chemical Formula 1, an anti-fluorite lattice structure may be formed. However, Mn may have a plurality of oxidation numbers of 2+, 3+, 4+, and 7+, and Fe may have a plurality of oxidation numbers of 2+ and 3+. Accordingly, when CoO, MnO, $Fe_2O_3$ and the like, which are raw materials of the lithium cobalt oxide, are mixed and calcined, Mn or Fe may be oxidized and $Co^{2+}$ cations may be reduced to produce $Co^0$, that is, Co metal, which is not an anti-fluorite lattice structure having a single crystal phase. Even if alloyed $Li_6CoO_4$ having a single crystal phase is produced, it may be difficult to suppress the oxidative property of $Co^{4+}$ cations after initial charge because the oxidation number easily changes within the operating voltage in the case of Mn or Fe.

In the Chemical Formula 1, x may be 0.05 to 0.80.

In other words, the hetero-element (M) may be included in an amount of 5 mol % to 80 mol % based on the total metal elements excluding lithium in the lithium transition metal oxide of the Chemical Formula 1.

It is preferable that the content of the hetero-element (M) is 5 mol % or more based on the total metal elements excluding lithium so that the stabilizing effect of the crystal phase may be expressed. However, when an excessive amount of the hetero-element is introduced, the electrical conductivity of the lithium transition metal oxide may be lowered to increase resistance of the electrode and cause poor performance of the battery. Thus, it is preferable that the content of the hetero-element (M) is 80 mol % or less based on the total metal elements excluding lithium.

Specifically, the content of the hetero-element (M) may be 5 mol % or more, 10 mol % or more, or 15 mol % or more; and 80 mol % or less, 70 mol % or less, or 60 mol % or less based on the total metal elements excluding lithium.

Preferably, the content of the hetero-element (M) may be 10 mol % to 80 mol %, 10 mol % to 70 mol %, 15 mol % to 70 mol %, or 15 mol % to 60 mol % based on the total metal elements excluding lithium.

Meanwhile, two or more hetero-elements may be introduced into the lithium transition metal oxide. As a non-limiting example, at least one element selected from the group consisting of Al, Mg, Ti, Zr, Nb and W, and Zn may be introduced together as the hetero-element (M).

The stabilizing effect of the crystal phase of the lithium transition metal oxide may be expected to be proportional to the content of the hetero-element. However, as the amount of an introduced hetero-element such as electrochemically inactive Zn increases, the initial charge capacity may relatively decrease and the electrical conductivity may tend to decrease. Thus, Zn may be introduced as a main element of the hetero-element (M) together with at least one element selected from the group consisting of Al, Mg, Ti, Zr, Nb and W as a sub-element, thereby expressing a stabilizing effect of the crystal phase while securing excellent battery performance.

In this case, the content of the main element and the sub-element among the hetero-elements may be determined in consideration of the degree of expression of the above-described effect. As a non-limiting example, the hetero-element may include the main element in an amount of 4 mol % to 70 mol % and the sub-element in an amount of 1 mol % to 10 mol % based on the total metal elements excluding lithium in the lithium transition metal oxide.

Preferably, the lithium transition metal oxide may include at least one compound selected from the group consisting of $Li_6Co_{0.95}Zn_{0.05}O_4$, $Li_6Co_{0.9}Zn_{0.1}O_4$, $Li_6Co_{0.85}Zn_{0.15}O_4$, $Li_6Co_{0.8}Zn_{0.2}O_4$, $Li_6Co_{0.75}Zn_{0.25}O_4$, $Li_6Co_{0.7}Zn_{0.3}O_4$, $Li_6Co_{0.65}Zn_{0.35}O_4$, $Li_6Co_{0.6}Zn_{0.4}O_4$, $Li_6Co_{0.55}Zn_{0.45}O_4$, $Li_6Co_{0.5}Zn_{0.5}O_4$, $Li_6Co_{0.45}Zn_{0.55}O_4$, $Li_6Co_{0.4}Zn_{0.6}O_4$, $Li_6Co_{0.35}Zn_{0.65}O_4$, $Li_6Co_{0.3}Zn_{0.7}O_4$, $Li_6Co_{0.25}Zn_{0.75}O_4$, $Li_6Co_{0.2}Zn_{0.8}O_4$; $Li_6Co_{0.95}Al_{0.05}O_4$, $Li_6Co_{0.9}Al_{0.1}O_4$, $Li_6Co_{0.85}Al_{0.15}O_4$, $Li_6Co_{0.8}Al_{0.2}O_4$, $Li_6Co_{0.75}Al_{0.25}O_4$, $Li_6Co_{0.7}Al_{0.3}O_4$, $Li_6Co_{0.65}Al_{0.35}O_4$, $Li_6Co_{0.6}Al_{0.4}O_4$, $Li_6Co_{0.55}Al_{0.45}O_4$, $Li_6Co_{0.5}Al_{0.5}O_4$, $Li_6Co_{0.45}Al_{0.55}O_4$, $Li_6Co_{0.4}Al_{0.6}O_4$, $Li_6Co_{0.35}Al_{0.65}O_4$, $Li_6Co_{0.3}Al_{0.7}O_4$, $Li_6Co_{0.25}Al_{0.75}O_4$, $Li_6Co_{0.2}Al_{0.8}O_4$; $Li_6Co_{0.95}Mg_{0.05}O_4$, $Li_6Co_{0.9}Mg_{0.1}O_4$, $Li_6Co_{0.85}Mg_{0.15}O_4$, $Li_6Co_{0.8}Mg_{0.2}O_4$, $Li_6Co_{0.75}Mg_{0.25}O_4$, $Li_6Co_{0.7}Mg_{0.3}O_4$, $Li_6Co_{0.65}Mg_{0.35}O_4$, $Li_6Co_{0.6}Mg_{0.4}O_4$, $Li_6Co_{0.55}Mg_{0.45}O_4$, $Li_6Co_{0.5}Mg_{0.5}O_4$, $Li_6Co_{0.45}Mg_{0.55}O_4$, $Li_6Co_{0.4}Mg_{0.6}O_4$, $Li_6Co_{0.35}Mg_{0.65}O_4$, $Li_6Co_{0.3}Mg_{0.7}O_4$, $Li_6Co_{0.25}Mg_{0.75}O_4$, $Li_6Co_{0.2}Mg_{0.8}O_4$; $Li_6Co_{0.95}Ti_{0.05}O_4$, $Li_6Co_{0.9}Ti_{0.1}O_4$, $Li_6Co_{0.85}Ti_{0.15}O_4$, $Li_6Co_{0.8}Ti_{0.2}O_4$, $Li_6Co_{0.75}Ti_{0.25}O_4$, $Li_6Co_{0.7}Ti_{0.3}O_4$, $Li_6Co_{0.65}Ti_{0.35}O_4$, $Li_6Co_{0.6}Ti_{0.4}O_4$, $Li_6Co_{0.55}Ti_{0.45}O_4$, $Li_6Co_{0.5}Ti_{0.5}O_4$, $Li_6Co_{0.45}Ti_{0.55}O_4$, $Li_6Co_{0.4}Ti_{0.6}O_4$, $Li_6Co_{0.35}Ti_{0.65}O_4$, $Li_6Co_{0.3}Ti_{0.7}O_4$, $Li_6Co_{0.25}Ti_{0.75}O_4$, $Li_6Co_{0.2}Ti_{0.8}O_4$; $Li_6Co_{0.95}Zr_{0.05}O_4$, $Li_6Co_{0.9}Zr_{0.1}O_4$, $Li_6Co_{0.85}Zr_{0.15}O_4$, $Li_6Co_{0.8}Zr_{0.2}O_4$, $Li_6Co_{0.75}Zr_{0.25}O_4$, $Li_6Co_{0.7}Zr_{0.3}O_4$, $Li_6Co_{0.65}Zr_{0.35}O_4$, $Li_6Co_{0.6}Zr_{0.4}O_4$, $Li_6Co_{0.55}Zr_{0.45}O_4$, $Li_6Co_{0.5}Zr_{0.5}O_4$, $Li_6Co_{0.45}Zr_{0.55}O_4$, $Li_6Co_{0.4}Zr_{0.6}O_4$, $Li_6Co_{0.35}Zr_{0.65}O_4$, $Li_6Co_{0.3}Zr_{0.7}O_4$, $Li_6Co_{0.25}Zr_{0.75}O_4$, $Li_6Co_{0.2}Zr_{0.8}O_4$; $Li_6Co_{0.95}Nb_{0.05}O_4$, $Li_6Co_{0.9}Nb_{0.1}O_4$, $Li_6Co_{0.85}Nb_{0.15}O_4$, $Li_6Co_{0.8}Nb_{0.2}O_4$, $Li_6Co_{0.75}Nb_{0.25}O_4$, $Li_6Co_{0.7}Nb_{0.3}O_4$, $Li_6Co_{0.65}Nb_{0.35}O_4$, $Li_6Co_{0.6}Nb_{0.4}O_4$, $Li_6Co_{0.55}Nb_{0.45}O_4$, $Li_6Co_{0.5}Nb_{0.5}O_4$, $Li_6Co_{0.45}Nb_{0.55}O_4$, $Li_6Co_{0.4}Nb_{0.6}O_4$, $Li_6Co_{0.35}Nb_{0.65}O_4$, $Li_6Co_{0.3}Nb_{0.7}O_4$, $Li_6Co_{0.25}Nb_{0.75}O_4$, $Li_6Co_{0.2}Nb_{0.8}O_4$; $Li_6Co_{0.95}W_{0.05}O_4$, $Li_6Co_{0.9}W_{0.1}O_4$, $Li_6Co_{0.85}W_{0.15}O_4$, $Li_6Co_{0.8}W_{0.2}O_4$, $Li_6Co_{0.75}W_{0.25}O_4$, $Li_6Co_{0.7}W_{0.3}O_4$, $Li_6Co_{0.65}W_{0.35}O_4$, $Li_6Co_{0.6}W_{0.4}O_4$, $Li_6Co_{0.55}W_{0.45}O_4$, $Li_6Co_{0.5}W_{0.5}O_4$, $Li_6Co_{0.45}W_{0.55}O_4$, $Li_6Co_{0.4}W_{0.6}O_4$, $Li_6Co_{0.35}W_{0.65}O_4$, $Li_6Co_{0.3}W_{0.7}O_4$, $Li_6Co_{0.25}W_{0.75}O_4$, and $Li_6Co_{0.2}W_{0.8}O_4$.

Meanwhile, the lithium transition metal oxide has a lattice parameter of a unit lattice satisfying the following Equations 1 and 2:

$$6.53200 \text{ Å} \le a = b \le 6.54400 \text{ Å} \quad \text{[Equation 1]}$$

$$4.64930 \text{ Å} \le c \le 4.65330 \text{ Å} \quad \text{[Equation 2]}$$

In above Equations 1 and 2, a, b and c are lattice parameters of the lithium transition metal oxide obtained by an XRD Rietveld refinement method using CuKα rays.

The lithium transition metal oxide according to an embodiment of the present invention has an anti-fluorite lattice structure. In particular, the lithium transition metal oxide has an a-axis lattice parameter of 6.53200 Å to 6.54400 Å; a b-axis lattice parameter equal to the a-axis lattice parameter value; and a c-axis lattice parameter of 4.64930 Å to 4.65330 Å.

The lattice parameter may be determined by the XRD Rietveld refinement method using CuKα rays as a source for the lithium transition metal oxide.

As the lattice parameter values according to above Equations 1 and 2 are satisfied, the structural stability of the crystal lattice including the unit lattice may be improved. In addition, it is possible to reduce the strain applied to the crystal structure of the lithium transition metal oxide during charging and discharging of the battery, and to maintain a stable crystal structure even when a large amount of lithium ions are sacrificed by prelithiation.

Preferably, the lithium transition metal oxide has the a-axis lattice parameter of 6.54400 Å or less, 6.54380 Å or less, 6.54360 Å or less, 6.54350 Å or less, or 6.54330 Å or less; and 6.53200 Å or more, 6.53205 Å or more, or 6.53210 Å or more.

Preferably, the lithium transition metal oxide has the a-axis lattice parameter of 6.53200 Å to 6.54400 Å, 6.53205 Å to 6.54400 Å, 6.53205 Å to 6.54380 Å, 6.53205 Å to 6.54360 Å, 6.53205 Å to 6.54350 Å, 6.53210 Å to 6.54350 Å, or 6.53210 Å to 6.54330 Å.

Preferably, the lithium transition metal oxide has the c-axis lattice parameter of 4.64930 Å or more, 4.64935 Å or more, 4.64940 Å or more, or 4.64945 Å or more; and 4.65330 Å or less, 4.65328 Å or less, or 4.65326 Å or less.

Preferably, the lithium transition metal oxide has the c-axis lattice parameter of 4.64930 Å to 4.65330 Å, 4.64935 Å to 4.65330 Å, 4.64935 Å to 4.65328 Å, 4.64940 Å to 4.65328 Å, 4.64940 Å to 4.65326 Å, or 4.64945 Å to 4.65326 Å.

Furthermore, the lithium transition metal oxide may have a unit lattice volume (V) of 198.350 $Å^3$ to 199.170 $Å^3$. The unit lattice volume (V) may be also determined by the XRD Rietveld refinement method using CuKα rays as a target ray for the lithium transition metal oxide.

Specifically, the lithium transition metal oxide has a unit lattice volume (V) of 198.350 $Å^3$ or more, 198.360 $Å^3$ or more, 198.370 $Å^3$ or more, or 198.380 $Å^3$ or more; and 199.170 $Å^3$ or less, 199.160 $Å^3$ or less, 199.150 $Å^3$ or less, or 199.140 $Å^3$ or less.

Preferably, the lithium transition metal oxide has a unit lattice volume (V) of 198.350 $Å^3$ to 199.170 $Å^3$, 198.360 $Å^3$ to 199.170 $Å^3$, 198.360 $Å^3$ to 199.160 $Å^3$, 198.370 $Å^3$ to 199.160 $Å^3$, 198.370 $Å^3$ to 199.150 $Å^3$, 198.380 $Å^3$ to 199.150 $Å^3$, 198.380 $Å^3$ to 199.140 $Å^3$.

The lithium transition metal oxide has a property of irreversibly releasing lithium during charging and discharging of a lithium secondary battery. In particular, the lithium transition metal oxide may suppress a side reaction with an electrolyte, thereby improving safety and lifespan of the lithium secondary battery.

II. Method for Preparing Lithium Transition Metal Oxide

According to another embodiment of the present disclosure, there is provided a method for preparing the lithium transition metal oxide including:

a first step of obtaining a raw material mixture by solid-state mixing of lithium oxide, cobalt oxide and hetero-element (M) oxide; and a second step of obtaining a compound represented by the following Chemical Formula 1 by calcining the mixture obtained in the first step under an inert atmosphere and at a temperature of 550° C. to 750° C.:

[Chemical Formula 1]

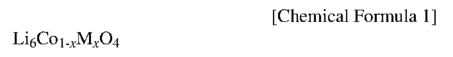

$Li_6Co_{1-x}M_xO_4$ in Chemical Formula 1,

M is at least one element selected from the group consisting of a group 2 element, a group 13 element, a group 14 element, a 4th period transition metal, a 5th period transition metal, and a 6th period transition metal, and x is 0.05 to 0.80.

In the above first step, there is provided a raw material mixture including a lithium oxide, a cobalt oxide and a hetero-element (M) oxide.

As the lithium oxide, an oxide containing lithium such as $Li_2O$ may be used without particular limitation.

In addition, as the cobalt oxide, an oxide containing cobalt such as CoO may be used without particular limitation.

Regarding the matters of the hetero-element (M), refer to the description presented in above "I. Lithium transition metal oxide." As the hetero-element oxide, an oxide containing the hetero-element (M) such as ZnO, MgO, $Al_2O_3$, $TiO_2$, $ZrO_2$, $NbO_2$, and $WO_3$ may be used without particular limitation.

The raw material mixture is prepared by solid-state mixing of the lithium oxide, the cobalt oxide, and the hetero-element oxide to meet a stoichiometric ratio of the Chemical Formula 1.

In the second step, the compound represented by the Chemical Formula 1 is obtained by calcining the raw material mixture obtained in the first step under an inert atmosphere and at a temperature of 550° C. to 750° C.

The second step may be performed under an inert atmosphere formed by using an inert gas such as Ar, $N_2$, Ne, and He.

In the second step, it is preferable that the mixture obtained in the first step is heated at a heating rate of 1.4° C./min to 2.0° C./min under an inert atmosphere so as to reach the calcining temperature.

When the heating rate is too slow, crystal seeds may be slowly formed and crystal growth may be continued, and thus grains may become too large. Thus, it is preferable that the heating rate is 1.4° C./min or more. However, when the heating rate is excessively fast, a large amount of crystal seeds may be generated at a very high rate, and the growth time of grains may be relatively short, and thus crystallinity may be relatively low and grain size may be relatively small. Thus, it is preferable that the heating rate is 2.0° C./min or less.

Specifically, the heating rate may be 1.40° C./min or more, 1.45° C./min or more, or 1.50° C./min or more; and 2.00° C./min or less, 1.95° C./min or less, or 1.90° C./min or less. Preferably, the heating rate may be 1.40° C./min to 2.00° C./min, 1.45° C./min to 2.00° C./min, 1.45° C./min to 1.95° C./min, 1.50° C./min to 1.95° C./min, or 1.50° C./min to 1.90° C./min.

The calcination may be performed at a temperature of 550° C. to 750° C.

It is preferable that the calcination temperature is 550° C. or more so that crystal seeds may be generated at an appropriate rate. However, when the calcination temperature is excessively high, a sintering phenomenon may occur in which the grown crystal grains agglomerate. Thus, it is preferable that the calcination temperature is 750° C. or less.

Specifically, the calcination temperature may be 550° C. or more, 580° C. or more, or 600° C. or more; and 750° C. or less, 720° C. or less, or 700° C. or less. Preferably, the calcination temperature may be 580° C. to 750° C., 580° C. to 720° C., 600° C. to 720° C., or 600° C. to 700° C.

The calcination may be performed for 2 to 20 hours at the calcination temperature. The calcination time may be adjusted in consideration of the time required for a hetero-element to be introduced into the lithium cobalt oxide in the form of an alloy or doping so as to stabilize crystals. Specifically, the calcination time may be 2 hours or more, 3 hours or more, or 4 hours or more; and 20 hours or less, 19 hours or less, or 18 hours or less. Preferably, the calcination time may be 3 to 20 hours, 3 to 19 hours, 4 to 19 hours, or 4 to 18 hours.

The compound of the Chemical Formula 1 obtained in the second step may have a cumulative 50% particle diameter (D50) of 1 μm to 30 μm when measured by laser diffraction scattering particle size distribution. If necessary, a step of pulverization and classification may be performed so that the compound of the Chemical Formula 1 may have the above D50 value within the above range.

It is preferable that the D50 value is 1 μm or more in order to prevent a side reaction with the electrolyte from being aggravated due to an excessively large specific surface area. However, when the particle size is too large, it is difficult to uniformly coat the positive electrode material including the compound of the Chemical Formula 1 on a current collector, and may cause damage to the current collector during a rolling process after drying. Thus, it is preferable that the D50 value is 30 μm or less.

Specifically, the compound of the Chemical Formula 1 may have the D50 value of 1 μm or more, 3 μm or more, or 5 μm or more; and 30 μm or less, 27 μm or less, or 25 μm or less. Preferably, the compound of the Chemical Formula 1 may have the D50 value of 3 μm to 30 μm, 3 μm to 27 μm, 5 μm to 27 μm, or 5 μm to 25 μm.

If necessary, a step of washing and drying the compound represented by the Chemical Formula 1 obtained in the second step may be performed.

As a non-limiting example, the washing process may be performed by a method of mixing the compound of the Chemical Formula 1 and a washing solution at a weight ratio of 1:2 to 1:10, followed by stirring. Distilled water, ammonia water, etc. may be used as the washing solution. The drying may be performed by a method of heat-treating at a temperature of 100° C. to 200° C. or 100° C. to 180° C. for 1 to 10 hours.

Through a series of processes described above, a lithium transition metal oxide represented by the Chemical Formula 1 and having a lattice parameter of a unit lattice satisfying above Equations 1 and 2 may be prepared.

III. Positive Electrode Additive for Lithium Secondary Battery

According to another embodiment of the present disclosure, there is provided a positive electrode additive for a lithium secondary battery including a lithium transition metal oxide represented by the following Chemical Formula 1, wherein a lattice parameter of a unit lattice satisfies the following Equations 1 and 2:

[Chemical Formula 1]

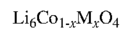

$$Li_6Co_{1-x}M_xO_4$$

in Chemical Formula 1,

M is at least one element selected from the group consisting of a group 2 element, a group 13 element, a group 14 element, a 4th period transition metal, a 5th period transition metal, and a 6th period transition metal, and x is 0.05 to 0.80;

$$6.53200\ Å \le a = b \le 6.54400\ Å \quad \text{[Equation 1]}$$

$$4.64930\ Å \le c \le 4.65330\ Å \quad \text{[Equation 2]}$$

in Equations 1 and 2, a, b and c are lattice parameters of the lithium transition metal oxide obtained by an XRD Rietveld refinement method using CuKα rays.

The lithium transition metal oxide represented by the Chemical Formula 1 and satisfying above Equations 1 and 2 may minimize a side reaction with an electrolyte so as to suppress gas generation at a positive electrode during charging and discharging of a lithium secondary battery. Thus, the positive electrode additive for the lithium secondary battery including the lithium transition metal oxide may allow improved safety and lifespan of the lithium secondary battery.

The positive electrode additive for the lithium secondary battery including the lithium transition metal oxide has a property of irreversibly releasing lithium during charging and discharging of the lithium secondary battery. Thus, the positive electrode additive for the lithium secondary battery is included in the positive electrode for the lithium secondary battery, and functions as a sacrificial positive electrode material for prelithiation.

Regarding the matters of the lithium transition metal oxide, refer to the description presented in above "I. Lithium transition metal oxide."

The lithium transition metal oxide represented by the Chemical Formula 1 has a composition in which a hetero-element (M) is alloyed or doped into $Li_6CoO_4$.

In the Chemical Formula 1, the hetero-element (M) is at least one element selected from the group consisting of a group 2 element, a group 13 element, a group 14 element, a 4th period transition metal, a 5th period transition metal, and a 6th period transition metal.

Specifically, the group 2 element includes at least one selected from the group consisting of Mg, Ca, Sr and Ba; the group 13 element includes at least one selected from the group consisting of Al, Ga and In; the group 14 element includes at least one selected from the group consisting of Si, Ge and Sn; the 4th period transition metal includes at least one selected from the group consisting of Sc, Ti, V, Cr, Mn, Fe, Co, Ni, Cu and Zn; the 5th period transition metal includes at least one selected from the group consisting of Y, Zr, Nb, Mo, Tc, Ru, Rh, Pd, Ag and Cd; and the 6th period transition metal includes at least one selected from the group consisting of Lu, Hf, Ta, W, Re, Os, Ir, Pt and Au.

Preferably, in terms of ease of alloying or doping with lithium cobalt oxide and stabilization of the crystal phase, the M may be at least one element selected from the group consisting of Zn, Al, Mg, Ti, Zr, Nb and W.

The hetero-element (M) may be included in an amount of 5 mol % to 80 mol % based on the total metal elements excluding lithium in the lithium transition metal oxide of the Chemical Formula 1.

Two or more hetero-elements may be introduced into the lithium transition metal oxide.

Preferably, the lithium transition metal oxide may include at least one compound selected from the group consisting of $Li_6Co_{0.95}Zn_{0.05}O_4$, $Li_6Co_{0.9}Zn_{0.1}O_4$, $Li_6Co_{0.85}Zn_{0.15}O_4$, $Li_6Co_{0.8}Zn_{0.2}O_4$, $Li_6Co_{0.75}Zn_{0.25}O_4$, $Li_6Co_{0.7}Zn_{0.3}O_4$, $Li_6Co_{0.65}Zn_{0.35}O_4$, $Li_6Co_{0.6}Zn_{0.4}O_4$, $Li_6Co_{0.55}Zn_{0.45}O_4$, $Li_6Co_{0.5}Zn_{0.5}O_4$, $Li_6Co_{0.45}Zn_{0.55}O_4$, $Li_6Co_{0.4}Zn_{0.6}O_4$, $Li_6Co_{0.35}Zn_{0.65}O_4$, $Li_6Co_{0.3}Zn_{0.7}O_4$, $Li_6Co_{0.25}Zn_{0.75}O_4$, $Li_6Co_{0.2}Zn_{0.8}O_4$; $Li_6Co_{0.95}Al_{0.05}O_4$, $Li_6Co_{0.9}Al_{0.1}O_4$, $Li_6Co_{0.85}Al_{0.15}O_4$, $Li_6Co_{0.8}Al_{0.2}O_4$, $Li_6Co_{0.75}Al_{0.25}O_4$, $Li_6Co_{0.7}Al_{0.3}O_4$, $Li_6Co_{0.65}Al_{0.35}O_4$, $Li_6Co_{0.6}Al_{0.4}O_4$, $Li_6Co_{0.55}Al_{0.45}O_4$, $Li_6Co_{0.5}Al_{0.5}O_4$, $Li_6Co_{0.45}Al_{0.55}O_4$, $Li_6Co_{0.4}Al_{0.6}O_4$, $Li_6Co_{0.35}Al_{0.65}O_4$, $Li_6Co_{0.3}Al_{0.7}O_4$, $Li_6Co_{0.25}Al_{0.75}O_4$, $Li_6Co_{0.2}Al_{0.8}O_4$; $Li_6Co_{0.95}Mg_{0.05}O_4$, $Li_6Co_{0.9}Mg_{0.1}O_4$, $Li_6Co_{0.85}Mg_{0.15}O_4$, $Li_6Co_{0.8}Mg_{0.2}O_4$, $Li_6Co_{0.75}Mg_{0.25}O_4$, $Li_6Co_{0.7}Mg_{0.3}O_4$, $Li_6Co_{0.65}Mg_{0.35}O_4$, $Li_6Co_{0.6}Mg_{0.4}O_4$, $Li_6Co_{0.55}Mg_{0.45}O_4$, $Li_6Co_{0.5}Mg_{0.5}O_4$, $Li_6Co_{0.45}Mg_{0.55}O_4$, $Li_6Co_{0.4}Mg_{0.6}O_4$, $Li_6Co_{0.35}Mg_{0.65}O_4$, $Li_6Co_{0.3}Mg_{0.7}O_4$, $Li_6Co_{0.25}Mg_{0.75}O_4$, $Li_6Co_{0.2}Mg_{0.8}O_4$; $Li_6Co_{0.95}Ti_{0.05}O_4$, $Li_6Co_{0.9}Ti_{0.1}O_4$, $Li_6Co_{0.85}Ti_{0.15}O_4$, $Li_6Co_{0.8}Ti_{0.2}O_4$, $Li_6Co_{0.75}Ti_{0.25}O_4$, $Li_6Co_{0.7}Ti_{0.3}O_4$, $Li_6Co_{0.65}Ti_{0.35}O_4$, $Li_6Co_{0.6}Ti_{0.4}O_4$, $Li_6Co_{0.55}Ti_{0.45}O_4$, $Li_6Co_{0.5}Ti_{0.5}O_4$, $Li_6Co_{0.45}Ti_{0.55}O_4$, $Li_6Co_{0.4}Ti_{0.6}O_4$, $Li_6Co_{0.35}Ti_{0.65}O_4$, $Li_6Co_{0.3}Ti_{0.7}O_4$, $Li_6Co_{0.25}Ti_{0.75}O_4$, $Li_6Co_{0.2}Ti_{0.8}O_4$; $Li_6Co_{0.95}Zr_{0.05}O_4$, $Li_6Co_{0.9}Zr_{0.1}O_4$, $Li_6Co_{0.85}Zr_{0.15}O_4$, $Li_6Co_{0.8}Zr_{0.2}O_4$, $Li_6Co_{0.75}Zr_{0.25}O_4$, $Li_6Co_{0.7}Zr_{0.3}O_4$, $Li_6Co_{0.65}Zr_{0.35}O_4$, $Li_6Co_{0.6}Zr_{0.4}O_4$, $Li_6Co_{0.55}Zr_{0.45}O_4$, $Li_6Co_{0.5}Zr_{0.5}O_4$, $Li_6Co_{0.45}Zr_{0.55}O_4$, $Li_6Co_{0.4}Zr_{0.6}O_4$, $Li_6Co_{0.35}Zr_{0.65}O_4$, $Li_6Co_{0.3}Zr_{0.7}O_4$, $Li_6Co_{0.25}Zr_{0.75}O_4$, $Li_6Co_{0.2}Zr_{0.8}O_4$; $Li_6Co_{0.95}Nb_{0.05}O_4$, $Li_6Co_{0.9}Nb_{0.1}O_4$, $Li_6Co_{0.85}Nb_{0.15}O_4$, $Li_6Co_{0.8}Nb_{0.2}O_4$, $Li_6Co_{0.75}Nb_{0.25}O_4$, $Li_6Co_{0.7}Nb_{0.3}O_4$, $Li_6Co_{0.65}Nb_{0.35}O_4$, $Li_6Co_{0.6}Nb_{0.4}O_4$, $Li_6Co_{0.55}Nb_{0.45}O_4$, $Li_6Co_{0.5}Nb_{0.5}O_4$, $Li_6Co_{0.45}Nb_{0.55}O_4$, $Li_6Co_{0.4}Nb_{0.6}O_4$, $Li_6Co_{0.35}Nb_{0.65}O_4$, $Li_6Co_{0.3}Nb_{0.7}O_4$, $Li_6Co_{0.25}Nb_{0.75}O_4$, $Li_6Co_{0.2}Nb_{0.8}O_4$; $Li_6Co_{0.95}W_{0.05}O_4$, $Li_6Co_{0.9}W_{0.1}O_4$, $Li_6Co_{0.85}W_{0.15}O_4$, $Li_6Co_{0.8}W_{0.2}O_4$, $Li_6Co_{0.75}W_{0.25}O_4$, $Li_6Co_{0.7}W_{0.3}O_4$, $Li_6Co_{0.65}W_{0.35}O_4$, $Li_6Co_{0.6}W_{0.4}O_4$, $Li_6Co_{0.55}W_{0.45}O_4$, $Li_6Co_{0.5}W_{0.5}O_4$, $Li_6Co_{0.45}W_{0.55}O_4$, $Li_6Co_{0.4}W_{0.6}O_4$, $Li_6Co_{0.35}W_{0.65}O_4$, $Li_6Co_{0.3}W_{0.7}O_4$, $Li_6Co_{0.25}W_{0.75}O_4$, and $Li_6Co_{0.2}W_{0.8}O_4$.

The lithium transition metal oxide has an anti-fluorite lattice structure. In particular, the lithium transition metal oxide has an a-axis lattice parameter of 6.53200 Å to 6.54400 Å; a b-axis lattice parameter equal to the a-axis lattice parameter value; and a c-axis lattice parameter of 4.64930 Å to 4.65330 Å.

Furthermore, the lithium transition metal oxide may have a unit lattice volume (V) of 198.350 $Å^3$ to 199.170 $Å^3$.

IV. Positive Electrode for Lithium Secondary Battery

According to another embodiment of the present disclosure, there is provided a positive electrode for a lithium secondary battery.

The positive electrode for the lithium secondary battery may include a positive electrode active material, a binder, a conductive material, and the lithium transition metal oxide.

In addition, the positive electrode for the lithium secondary battery may include a positive electrode active material, a binder, a conductive material, and the positive electrode additive for the lithium secondary battery.

The lithium transition metal oxide and the positive electrode additive for the lithium secondary battery have a property of irreversibly releasing lithium during charging and discharging of the lithium secondary battery. Thus, the lithium transition metal oxide and the positive electrode additive for the lithium secondary battery may be included in the positive electrode for the lithium secondary battery, and may function as a sacrificial positive electrode material for prelithiation.

Preferably, the positive electrode for the lithium secondary battery includes a positive electrode material including a positive electrode active material, a conductive material, the sacrificial positive electrode material, and a binder; and a current collector for supporting the positive electrode material.

Herein, the sacrificial positive electrode material is the lithium transition metal oxide or the positive electrode additive for the lithium secondary battery. Regarding the matters of the sacrificial positive electrode material, refer to the description presented in above "I. Lithium transition metal oxide" and "III. Positive electrode additive for lithium secondary battery."

In the case of a high-capacity battery, the ratio of the negative electrode active material in the negative electrode needs to be more increased in order to increase the battery capacity, and thus the amount of lithium consumed in an SEI layer is also increased. Thus, after calculating the amount of lithium consumed in the SEI layer of the negative electrode, the amount of the sacrificial positive electrode material to be applied to the positive electrode may be inversely calculated to determine the design capacity of the battery.

According to one embodiment, the sacrificial positive electrode material may be included in an amount of more than 0 wt % and 15 wt % or less based on the total weight of the positive electrode material.

It is preferable that the content of the sacrificial positive electrode material is more than 0 wt % based on the total weight of the positive electrode material in order to compensate for irreversible lithium consumed in the formation of the SEI layer.

However, when an excessive amount of the sacrificial positive electrode material is included, the content of the positive electrode active material exhibiting a reversible charge/discharge capacity may be decreased to reduce the capacity of the battery, and residual lithium in the battery may be plated on the negative electrode, thereby causing a short circuit of the battery or hindering safety. Thus, it is preferable that the content of the sacrificial positive electrode material is 15 wt % or less based on the total weight of the positive electrode material.

Specifically, the content of the sacrificial positive electrode material is more than 0 wt %, 0.5 wt % or more, 1 wt % or more, 2 wt % or more, or 3 wt % or more; and 15 wt % or less, 12 wt % or less, or 10 wt % or less based on the total weight of the positive electrode material.

Preferably, the content of the sacrificial positive electrode material may be 0.5 wt % to 15 wt %, 1 wt % to 15 wt %, 1 wt % to 12 wt %, 2 wt % to 12 wt %, 2 wt % to 10 wt %, or 3 wt % to 10 wt % based on the total weight of the positive electrode material.

As the positive electrode active material, a compound known to be applicable to the lithium secondary battery in the art to which the present invention pertains may be used without particular limitation.

As a non-limiting example, the positive electrode active material may include NCM($Li[Ni,Co,Mn]O_2$), NCMA($Li[Ni,Co,Mn,Al]O_2$), $LiCoO_2$, $LiNiO_2$, $LiMnO_2$, $LiMn_2O_2$, $LiNi_{1-d}Co_dO_2$, $LiCo_{1-d}Mn_dO_2$, $LiNi_{1-d}Mn_dO_2$ (in above $0 \leq d < 1$), $Li(Ni_aCo_bMn_c)O_4$ ($0<a<2$, $0<b<2$, $0<c<2$, $a+b+c=2$), $LiMn_{2-e}Ni_eO_4$, $LiMn_{2-e}Co_eO_4$ (in above $0<e<2$), $LiCoPO_4$, $LiFePO_4$, and the like. As the positive electrode active material, one or a mixture of two or more of the above-described examples may be used.

According to one embodiment, the positive electrode active material may be included in an amount of 80 wt % to 98 wt % based on the total weight of the positive electrode material.

Specifically, the content of the positive electrode active material may be 80 wt % or more, 82 wt % or more, or 85 wt % or more; and 98 wt % or less, 95 wt % or less, 93 wt % or less, or 90 wt % or less based on the total weight of the positive electrode material.

Preferably, the content of the positive electrode active material may be 82 wt % to 98 wt %, 82 wt % to 95 wt %, 82 wt % to 93 wt %, 85 wt % to 93 wt %, or 85 wt % to 90 wt % based on the total weight of the positive electrode material.

The conductive material is used to impart conductivity to the electrode.

A conductive material may be used without any particular limitation as long as it has electronic conductivity without causing a chemical change in the battery. As a non-limiting example, the conductive material may include a carbon-based material such as carbon black, acetylene black, ketjen black, channel black, furnace black, lamp black, summer black, carbon fiber, etc.; graphite such as natural graphite, artificial graphite, etc.; metal powders or metal fibers such as copper, nickel, aluminum, silver, etc.; conductive whiskeys such as zinc oxide, potassium titanate, etc.; conductive metal oxides such as titanium oxide, etc.; a conductive polymer such as a polyphenylene derivative, etc.; or the like. As the conductive material, one or a mixture of two or more of the above-described examples may be used.

The content of the conductive material may be adjusted in a range that does not cause a decrease in the capacity of the battery while expressing an appropriate level of conductivity. Preferably, the content of the conductive material may be 0.5 wt % to 10 wt %, 1 wt % to 10 wt %, or 1 wt % to 5 wt % based on the total weight of the positive electrode material.

The binder is used to attach the positive electrode material well to the current collector.

As a non-limiting example, the binder may be polyvinylidene fluoride (PVdF), vinylidene fluoride-hexafluoropropylene copolymer (PVdF-co-HFP), polyvinyl alcohol, polyacrylonitrile, carboxymethyl cellulose (CMC), starch, hydroxypropylcellulose, regenerated cellulose, polyvinylpyrrolidone, polytetrafluoroethylene, polyethylene, polypropylene, ethylene-propylene-diene polymer (EPDM), sulfonated-EPDM, styrene-butadiene rubber (SBR), fluororubber, etc. As the binder, one or a mixture of two or more of the above-described examples may be used.

The content of the binder may be adjusted in a range that does not cause a decrease in the capacity of the battery while expressing an appropriate level of adhesiveness. Preferably, the content of the binder may be 0.5 wt % to 10 wt %, 1 wt % to 10 wt %, or 1 wt % to 5 wt % based on the total weight of the positive electrode material.

As the current collector, a material known to be applicable to the positive electrode of a lithium secondary battery in the art to which the present invention pertains may be used without particular limitation.

As a non-limiting example, the current collector used herein may include stainless steel; aluminum; nickel; titanium; calcined carbon; aluminum or stainless steel surface treated with carbon, nickel, titanium, silver, etc.; or the like.

Preferably, the current collector may have a thickness of 3 μm to 500 μm. In order to increase adhesion of the positive electrode material, the current collector may have fine unevenness formed on a surface thereof. The current collector may have various forms such as film, sheet, foil, net, a porous body, a foam body, a nonwoven body, etc.

The positive electrode for the lithium secondary battery may be formed by stacking a positive electrode material including the positive electrode active material, the conductive material, the sacrificial positive electrode material, and a binder on the current collector.

V. Lithium Secondary Battery

According to another embodiment of the present disclosure, there is provided a lithium secondary battery including the positive electrode for the lithium secondary battery; a negative electrode; a separator; and an electrolyte.

The lithium secondary battery may include a positive electrode including the lithium transition metal oxide or a positive electrode additive for the lithium secondary battery. Accordingly, the lithium secondary battery may suppress gas generation at the positive electrode during charging and discharging, and may exhibit improved safety and lifespan. In addition, the lithium secondary battery may exhibit a high discharge capacity, excellent output property, and capacity retention.

Accordingly, the lithium secondary battery may be used as a source of energy supply with improved performance and safety in the field of portable electronic devices such as mobile phones, laptop computers, tablet computers, mobile batteries, and digital cameras; and transportation means such as electric vehicles, electric motorcycles, and personal mobility devices.

The lithium secondary battery may include an electrode assembly wound with a separator interposed between the positive electrode and the negative electrode, and a case in which the electrode assembly is embedded. In addition, the positive electrode, the negative electrode, and the separator may be impregnated with an electrolyte.

The lithium secondary battery may have various shapes such as a prismatic shape, a cylindrical shape, a pouch shape, etc.

Regarding the matters of the positive electrode, refer to the description presented in above "IV. Positive electrode for lithium secondary battery."

The negative electrode may include a negative electrode material including a negative electrode active material, a conductive material, and a binder; and a current collector for supporting the negative electrode material.

The negative electrode active material may include a material capable of reversibly intercalating and deintercalating lithium ions, lithium metal, an alloy of lithium metal, a material capable of doping to and dedoping from lithium, and a transition metal oxide.

An example of the material capable of reversibly intercalating and deintercalating lithium ions may include crystalline carbon, amorphous carbon, or a mixture thereof as a carbonaceous material. Specifically, the carbonaceous material may be natural graphite, artificial graphite, Kish graphite, pyrolytic carbon, mesophase pitches, mesophase pitch-based carbon fiber, meso-carbon microbeads, petroleum or coal tar pitch derived cokes, soft carbon, hard carbon, etc.

The alloy of lithium metal may be an alloy of lithium and a metal selected from the group consisting of Na, K, Rb, Cs, Fr, Be, Mg, Ca, Sr, Si, Sb, Pb, In, Zn, Ba, Ra, Ge, Al, Sn, Bi, Ga, and Cd.

The material which may be doped to and dedoped from lithium may be Si, Si—C composite, SiOx ($0<x<2$), Si-Q alloy (in which the Q is an element selected from the group consisting of an alkali metal, an alkaline earth metal, a group 13 element, a group 14 element, a group 15 element, a group 16 element, a transition metal, a rare earth element, and a combination thereof; but except for Si), Sn, $SnO_2$, a Sn—R alloy (in which the R is an element selected from the group consisting of an alkali metal, an alkaline earth metal, a group 13 element, a group 14 element, a group 15 element, a group 16 element, a transition metal, a rare earth element, and a combination thereof; but except for Sn), etc. In addition, the material, which may be doped to and dedoped from lithium, used herein may include a mixture of $SiO_2$ and at least one of the above examples. The Q and R may be Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, TI, Ge, P, As, Sb, Bi, S, Se, Te, Po, etc.

In addition, the transition metal oxide may be vanadium oxide, lithium vanadium oxide, lithium titanium oxide, etc.

Preferably, the negative electrode may include at least one negative electrode active material selected from the group consisting of a carbonaceous material and a silicon compound.

Herein, the carbonaceous material may be at least one material selected from the group consisting of natural graphite, artificial graphite, Kish graphite, pyrolytic carbon, mesophase pitches, mesophase pitch-based carbon fiber, meso-carbon microbeads, petroleum or coal tar pitch derived cokes, soft carbon, and hard carbon, which are exemplified above. And, the silicon compound may be a compound including Si as exemplified above, that is, Si, Si—C composite, SiOx ($0<x<2$), the Si-Q alloy, a mixture thereof, or a mixture of $SiO_2$ and at least one thereof.

According to one embodiment, the negative electrode active material may be included in an amount of 85 wt % to 98 wt % based on the total weight of the negative electrode material.

Specifically, the content of the negative electrode active material may be 85 wt % or more, 87 wt % or more, or 90 wt % or more; and 98 wt % or less, 97 wt % or less, or 95 wt % or less based on the total weight of the negative electrode material.

Preferably, the content of the negative electrode active material may be 85 wt % to 97 wt %, 87 wt % to 97 wt %, 87 wt % to 95 wt %, or 90 wt % to 95 wt % based on the total weight of the negative electrode material.

Regarding the matters of the conductive material and the binder included in the negative electrode material, and the current collector, refer to the description presented in above "IV. Positive electrode for lithium secondary battery."

The separator separates the positive electrode and the negative electrode, and provides a passage for lithium ions to move. As the separator, a separator known to be applicable to the lithium secondary battery in the art to which the present invention pertains may be used without any particular limitation. It is preferable that the separator has excellent wettability to the electrolyte while having low resistance to ionic migration of the electrolyte.

Specifically, the separator may be a porous polymer film made of a polyolefin-based polymer such as polyethylene, polypropylene, ethylene-butene copolymer, ethylene-hexene copolymer, ethylene-methacrylate copolymer, etc. The separator may be a multilayer film in which the porous polymer films are laminated in two or more layers. The separator may be a nonwoven fabric including glass fibers, polyethylene terephthalate fibers, etc. In addition, the separator may be coated with a ceramic component or a polymer material in order to secure heat resistance or mechanical strength.

As the electrolyte, an electrolyte known to be applicable to the lithium secondary battery in the art to which the present invention pertains may be used without any particular limitation. For example, the electrolyte may be an organic liquid electrolyte, an inorganic liquid electrolyte, a solid polymer electrolyte, a gel-type polymer electrolyte, a solid inorganic electrolyte, a molten inorganic electrolyte, etc.

Specifically, the electrolyte may include a non-aqueous organic solvent and a lithium salt.

The non-aqueous organic solvent may be used without any particular limitation as long as it may serve as a medium through which ions involved in an electrochemical reaction of the battery may move.

Specifically, the non-aqueous organic solvent may include ester-based solvents such as methyl acetate, ethyl acetate, γ-butyrolactone, and ε-caprolactone; ether-based solvents such as dibutyl ether and tetrahydrofuran; ketone-based solvents such as cyclohexanone; aromatic hydrocarbon-based solvents such as benzene and fluorobenzene; carbonate-based solvents such as dimethyl carbonate (DMC), diethyl carbonate (DEC), methyl ethyl carbonate (MEC), ethyl methyl carbonate (EMC), ethylene carbonate (EC), and propylene carbonate (PC); alcohol-based solvents such as ethyl alcohol and isopropyl alcohol; nitriles such as R—CN (R is a C2 to C20 linear, branched or cyclic hydrocarbon group, which may include a double bond aromatic ring or an ether bond); amides such as dimethylformamide; dioxolanes such as 1,3-dioxolane; sulfolane; and the like.

Among the above examples, a carbonate-based solvent may be preferably used as the non-aqueous organic solvent.

In particular, in consideration of the battery charge/discharge performance and compatibility with the sacrificial positive electrode material, the non-aqueous organic solvent used herein may preferably be a mixture of cyclic carbonates (for example, ethylene carbonate and propylene carbonate) having high ionic conductivity and high dielectric constant and linear carbonates (for example, ethyl methyl carbonate, dimethyl carbonate and diethyl carbonate) having low viscosity. When the cyclic carbonate and the linear carbonate are mixed at a volume ratio of 1:1 to 1:9 and used, it may be advantageous for expressing the performance described above.

In addition, the non-aqueous organic solvent used herein may preferably include a mixture of ethylene carbonate (EC) and ethyl methyl carbonate (EMC) at a volume ratio of 1:2 to 1:10; or a mixture of ethylene carbonate (EC), ethyl methyl carbonate (EMC) and dimethyl carbonate (DMC) at a volume ratio of 1-3:1-9:1.

The lithium salt included in the electrolyte may be dissolved in the non-aqueous organic solvent so as to act as a source of supplying lithium ions in the battery, thereby enabling the lithium secondary battery to basically operate and playing a role to promote the movement of lithium ions between the positive electrode and the negative electrode.

Specifically, the lithium salt may include $LiPF_6$, $LiClO_4$, $LiAsF_6$, $LiBF_4$, $LiSbF_6$, $LiAlO_4$, $LiAlCl_4$, $LiCF_3SO_3$, $LiC_4FsSO_3$, $LiN(C_2F_5SO_3)_2$, $LiN(C_2F_5SO_2)_2$, $LiN(CF_3SO_2)_2$, $LiN(SO_2F)_2$ (LiFSI, lithium bis(fluorosulfonyl) imide), LiCl, LiI, $LiB(C_2O_4)_2$, and the like. Preferably, the lithium salt may be $LiPF_6$, LiFSI, or a mixture thereof.

The lithium salt may be included in the electrolyte at a concentration of 0.1 M to 2.0 M. The lithium salt included within the concentration range may impart appropriate conductivity and viscosity to the electrolyte, thereby enabling excellent electrolyte performance.

Optionally, the electrolyte may include additives for the purpose of improving battery lifespan, suppressing reduction in battery capacity, and improving a battery discharge capacity.

For example, the additive may include haloalkylene carbonate-based compounds such as difluoroethylene carbonate, pyridine, triethyl phosphite, triethanolamine, cyclic ether, ethylene diamine, n-glyme, hexamethyl phosphoric triamide, nitrobenzene derivatives, sulfur, quinoneimine dye, N-substituted oxazolidinone, N,N-substituted imidazolidine, ethylene glycol dialkyl ether, ammonium salt, pyrrole, 2-methoxy ethanol, aluminum trichloride, etc. The additive may be included in an amount of 0.1 wt % to 5 wt % based on the total weight of the electrolyte.

Advantageous Effects

The lithium transition metal oxide according to the present disclosure can maintain a stabilized lattice structure with a hetero-element introduced therein, and thus minimize a side reaction with an electrolyte so as to suppress gas generation during charging and discharging of a lithium secondary battery. The positive electrode additive for the lithium secondary battery including the lithium transition metal oxide may enable improved safety and lifespan of the lithium secondary battery.

BRIEF DESCRIPTION OF THE DRAWINGS

FIG. 1 is a graph showing a correlation between the irreversible capacity and the amount of gas generation of the lithium secondary batteries of Examples 1 to 3 and Comparative Example 1.

FIG. 2 is a graph showing a correlation between the irreversible capacity and the amount of gas generation of the lithium secondary batteries of Examples 1 and 4 to 7.

FIG. 3 is a graph showing capacity cycle retention according to the accumulation of charge/discharge cycles of the lithium secondary batteries of Example 8 and Comparative Examples 2 to 4.

DETAILED DESCRIPTION OF THE EMBODIMENTS

Hereinafter, the function and effect of the present invention will be described in more detail through specific examples. However, these examples are provided for illustrative purposes only. The scope of the invention is not intended to be limited by these examples, and it is apparent to those skilled in the art that various changes and modifications can be made within the scope and spirit of the present invention.

Example 1

(1) Synthesis of Lithium Transition Metal Oxide

A raw material mixture was prepared by solid-state mixing of $Li_2O$, CoO and ZnO at a molar ratio of Li:Co:Zn=6:0.7:0.3.

The raw material mixture was heated at a heating rate of 1.6° C./min under an Ar atmosphere for 6 hours, and then calcined at 600° C. for 12 hours so as to obtain a lithium transition metal oxide of $Li_6Co_{0.7}Zn_{0.3}O_4$.

The lithium transition metal oxide was pulverized by using a jaw crusher, and then classified by using a sieve shaker.

(2) Preparation of Lithium Secondary Battery

A positive electrode material slurry was prepared by mixing the lithium transition metal oxide ($Li_6Co_{0.7}Zn_{0.3}O_4$) as a positive electrode additive, carbon black as a conductive material, and polyvinylidene fluoride (PVdF) as a binder at a weight ratio of 95:3:2 in an organic solvent (N-methylpyrrolidone). The positive electrode material slurry was applied to one surface of a current collector, which was an aluminum foil having a thickness of 15 μm, and was rolled and dried to prepare a positive electrode. For reference, in this experiment, a positive electrode active material was not added to the positive electrode material. The addition of the positive active material is shown in Example 8 below.

A negative electrode material slurry was prepared by mixing natural graphite as a negative electrode active material, carbon black as a conductive material, and carboxymethylcellulose (CMC) as a binder at a weight ratio of 95:3:2 in an organic solvent (N-methylpyrrolidone). The negative electrode material slurry was applied to one surface of a current collector, which was a copper foil having a thickness of 15 μm, and was rolled and dried to prepare a negative electrode.

A non-aqueous organic solvent was prepared by mixing ethylene carbonate (EC), ethyl methyl carbonate (EMC) and dimethyl carbonate (DMC) at a volume ratio of 3:4:3. An electrolyte was prepared by dissolving lithium salts of $LiPF_6$ at a concentration of 0.7 M and LiFSI at a concentration of 0.5 M in the non-aqueous organic solvent.

An electrode assembly was prepared by interposing porous polyethylene as a separator between the positive electrode and the negative electrode, and the electrode assembly was placed inside the case. A lithium secondary battery in the form of a pouch cell was manufactured by injecting the electrolyte into the case.

Example 2

Except for using MgO instead of ZnO, (1) a lithium transition metal oxide of $Li_6Co_{0.7}Mg_{0.3}O_4$ and (2) a lithium secondary battery including the same as a positive electrode additive were manufactured by the same method as in above Example 1.

Example 3

Except for using $Al_2O_3$ instead of ZnO, (1) a lithium transition metal oxide of $Li_6Co_{0.7}Al_{0.3}O_4$ and (2) a lithium secondary battery including the same as a positive electrode additive were manufactured by the same method as in above Example 1.

Example 4

Except for using a raw material mixture obtained by solid-state mixing of $Li_2O$, CoO and ZnO at a molar ratio of Li:Co:Zn=6:0.9:0.1, (1) a lithium transition metal oxide of $Li_6Co_{0.9}Zn_{0.1}O_4$ and (2) a lithium secondary battery including the same as a positive electrode additive were manufactured by the same method as in above Example 1.

Example 5

Except for using a raw material mixture obtained by solid-state mixing of $Li_2O$, CoO and ZnO at a molar ratio of Li:Co:Zn=6:0.8:0.2, (1) a lithium transition metal oxide of $Li_6Co_{0.8}Zn_{0.2}O_4$ and (2) a lithium secondary battery including the same as a positive electrode additive were manufactured by the same method as in above Example 1.

Example 6

Except for using a raw material mixture obtained by solid-state mixing of $Li_2O$, CoO and ZnO at a molar ratio of Li:Co:Zn=6:0.6:0.4, (1) a lithium transition metal oxide of $Li_6Co_{0.6}Zn_{0.4}O_4$ and (2) a lithium secondary battery including the same as a positive electrode additive were manufactured by the same method as in above Example 1.

Example 7

Except for using a raw material mixture obtained by solid-state mixing of $Li_2O$, CoO and ZnO at a molar ratio of Li:Co:Zn=6:0.5:0.5, (1) a lithium transition metal oxide of $Li_6Co_{0.5}Zn_{0.5}O_4$ and (2) a lithium secondary battery including the same as a positive electrode additive were manufactured by the same method as in above Example 1.

Example 8

Except for further adding the positive electrode active material in the preparation of the positive electrode and changing the composition of the negative electrode active material in the preparation of the negative electrode, a lithium secondary battery was manufactured by the same method as in above Example 1.

Specifically, a positive electrode material slurry was prepared by mixing a NCMA($Li[Ni,Co,Mn,Al]O_2$)-based compound (NTA-X12M, L&F) as a positive electrode active material, the lithium transition metal oxide ($Li_6Co_{0.7}Zn_{0.3}O_4$) as a positive electrode additive, carbon black as a conductive material, and polyvinylidene fluoride (PVdF) as a binder at a weight ratio of 93.8:1.2:3:2 in an organic solvent (N-methylpyrrolidone). The positive electrode material slurry was applied to one surface of a current collector, which was an aluminum foil having a thickness of 15 μm, and was rolled and dried to prepare a positive electrode.

A negative electrode material slurry was prepared by mixing a mixture of natural graphite and SiO (weight ratio=9:1) as a negative electrode active material, carbon black as a conductive material, and carboxymethylcellulose (CMC) as a binder at a weight ratio of 95:3:2 in an organic solvent (N-methylpyrrolidone). The negative electrode material slurry was applied to one surface of a current collector, which was a copper foil having a thickness of 15 μm, and was rolled and dried to prepare a negative electrode.

An electrode assembly was prepared by interposing porous polyethylene as a separator between the positive electrode and the negative electrode, and the electrode assembly was placed inside the case. A lithium secondary battery in the form of a pouch cell was manufactured by injecting the electrolyte into the case.

Example 9

Except for heating the raw material mixture at a rate of 1.6° C./min under an Ar atmosphere and calcining the same at 600° C. for 6 hours, (1) a lithium transition metal oxide of $Li_6Co_{0.7}Zn_{0.3}O_4$ and (2) a lithium secondary battery including the same as a positive electrode additive were manufactured by the same method as in above Example 1.

Example 10

Except for heating the raw material mixture at a rate of 1.6° C./min under an Ar atmosphere and calcining the same at 600° C. for 18 hours, (1) a lithium transition metal oxide of $Li_6Co_{0.7}Zn_{0.3}O_4$ and (2) a lithium secondary battery including the same as a positive electrode additive were manufactured by the same method as in above Example 1.

Example 11

Except for heating the raw material mixture at a rate of 1.9° C./min under an Ar atmosphere and calcining the same at 700° C. for 12 hours, (1) a lithium transition metal oxide of $Li_6Co_{0.7}Zn_{0.3}O_4$ and (2) a lithium secondary battery including the same as a positive electrode additive were manufactured by the same method as in above Example 1.

Comparative Example 1

Except for mixing $Li_2O$ and CoO at a molar ratio of Li:Co=6:1 without the addition of ZnO, (1) a lithium transition metal oxide of $Li_6CoO_4$ and (2) a lithium secondary battery including the same as a positive electrode additive were manufactured by the same method as in above Example 1.

Comparative Example 2

Except for using $Li_6CoO_4$ obtained in above Comparative Example 1 instead of $Li_6Co_{0.7}Zn_{0.3}O_4$ as a positive electrode additive in the preparation of the positive electrode, a lithium secondary battery was manufactured by the same method as in above Example 8.

Comparative Example 3

Except for mixing a NCMA($Li[Ni,Co,Mn,Al]O_2$)-based compound (NTA-X12M, L&F) as a positive electrode active material, DN2O ($Li_2NiO_2$, POSCO Chemical) instead of the lithium transition metal oxide ($Li_6Co_{0.7}Zn_{0.3}O_4$) as a positive electrode additive, carbon black as a conductive material, and polyvinylidene fluoride (PVdF) as a binder at a weight ratio of 91.2:3.8:3:2 in the preparation of the positive electrode, a lithium secondary battery was manufactured by the same method as in above Example 8.

Comparative Example 4

Except for not adding the positive electrode additive in the preparation of the positive electrode, a lithium secondary battery was manufactured by the same method as in above Example 8.

Comparative Example 5

Except for heating the raw material mixture at a rate of 0.5° C./min under an Ar atmosphere and calcining the same at 600° C. for 6 hours, (1) a lithium transition metal oxide of $Li_6Co_{0.7}Zn_{0.3}O_4$ and (2) a lithium secondary battery including the same as a positive electrode additive were manufactured by the same method as in above Example 1.

Comparative Example 6

Except for heating the raw material mixture at a rate of 5.0° C./min under an Ar atmosphere and calcining the same at 600° C. for 6 hours, (1) a lithium transition metal oxide of $Li_6Co_{0.7}Zn_{0.3}O_4$ and (2) a lithium secondary battery including the same as a positive electrode additive were manufactured by the same method as in above Example 1.

Comparative Example 7

Except for heating the raw material mixture at a rate of 10.0° C./min under an Ar atmosphere and calcining the same at 600° C. for 6 hours, (1) a lithium transition metal oxide of $Li_6Co_{0.7}Zn_{0.3}O_4$ and (2) a lithium secondary battery including the same as a positive electrode additive were manufactured by the same method as in above Example 1.

Test Example 1

The lithium transition metal oxides obtained in above Examples 1 to 7 and above Comparative Example 1 were subjected to X-ray diffraction analysis (model name: D8 ENDEAVOR, manufactured by: Bruker) using CuKα rays as a source. The profile obtained through the X-ray diffraction analysis was calculated by a Rietveld refinement method so as to obtain a lattice parameter value of a unit lattice and a volume value.

TABLE 1

| | Lattice parameter (Å) | | Volume |
|---|---|---|---|
| | a = b | c | (Å$^3$) |
| Example 1 ($Li_6Co_{0.7}Zn_{0.3}O_4$) | 6.54111 | 4.65200 | 199.041 |
| Example 2 ($Li_6Co_{0.7}Mg_{0.3}O_4$) | 6.53211 | 4.64948 | 198.386 |
| Example 3 ($Li_6Co_{0.7}Al_{0.3}O_4$) | 6.53732 | 4.65003 | 198.726 |
| Example 4 ($Li_6Co_{0.9}Zn_{0.1}O_4$) | 6.54325 | 4.65107 | 199.131 |
| Example 5 ($Li_6Co_{0.8}Zn_{0.2}O_4$) | 6.54209 | 4.65150 | 199.079 |
| Example 6 ($Li_6Co_{0.6}Zn_{0.4}O_4$) | 6.54031 | 4.65259 | 199.071 |
| Example 7 ($Li_6Co_{0.5}Zn_{0.5}O_4$) | 6.53968 | 4.65326 | 199.008 |
| Example 9 ($Li_6Co_{0.7}Zn_{0.3}O_4$) | 6.54127 | 4.65213 | 199.056 |
| Example 10 ($Li_6Co_{0.7}Zn_{0.3}O_4$) | 6.54045 | 4.65172 | 198.989 |
| Example 11 ($Li_6Co_{0.7}Zn_{0.3}O_4$) | 6.54080 | 4.65187 | 199.016 |
| Comparative Example 1 ($Li_6CoO_4$) | 6.54460 | 4.65069 | 199.197 |
| Comparative Example 5 ($Li_6Co_{0.7}Zn_{0.3}O_4$) | 6.53131 | 4.65098 | 198.888 |
| Comparative Example 6 ($Li_6Co_{0.7}Zn_{0.3}O_4$) | 6.54351 | 4.65335 | 199.245 |
| Comparative Example 7 ($Li_6Co_{0.7}Zn_{0.3}O_4$) | 6.54413 | 4.65361 | 199.294 |

Referring to above table 1, it is confirmed that the lithium transition metal oxides of Examples 1 to 7 have the composition of above Chemical Formula 1 and satisfy the lattice parameter values of above Equations 1 and 2. In contrast, it is confirmed that the lithium transition metal oxide of Comparative Example 1 does not include a hetero-element and thus does not have the composition of above Chemical Formula 1, and the lattice parameter value does not satisfy above Equations 1 and 2.

And, referring to Examples 1 and 4 to 7, as the amount of the introduced hetero-element increases, an a-axis lattice parameter value tends to relatively decrease and a c-axis lattice parameter value tends to relatively increase.

In addition, referring to Examples 1, 9 and 10, the a-axis and c-axis lattice parameter values tended to gradually decrease as the calcination time of the raw material mixture increased. Even in the case of Example 11 in which the calcination temperature was increased to 700° C., the lattice parameter value did not significantly decrease compared to Example 1.

In contrast, in the case of Comparative Example 5 in which the heating rate was low, crystal growth of the lithium transition metal oxide excessively occurred, and thus the a-axis and c-axis lattice parameter values were significantly reduced compared to Example 1. And, in the case of Comparative Examples 6 and 7 in which the heating rate was high, the crystal growth time of the lithium transition metal oxide was relatively insufficient compared to Example 1, thereby lowering the crystallinity. Thus, it is confirmed that the a-axis and c-axis lattice parameter values increase compared to Example 1.

Test Example 2

An experiment was conducted to confirm the amount of cumulative gas generation according to the initial charge capacity and the cumulative charge/discharge capacity of the lithium secondary battery, which varied depending on whether or not a hetero-element was introduced into $Li_6CoO_4$ and the type of the hetero-element.

Herein, the irreversible capacity may be defined as "charge capacity−discharge capacity=irreversible capacity," and the cumulative irreversible capacity may be defined as the sum of irreversible capacities at every charge/discharge cycle.

For the lithium secondary batteries of Examples 1 to 3 and Comparative Example 1, the amount of cumulative gas generation according to the accumulation of charge/discharge cycles was measured by the following method, and the measured amount of gas generation according to the cumulative charge capacity is shown in the graph of FIG. 1.

(1) Measurement of Formation (Initial Charge) Capacity and Charge/Discharge Capacity A pouch cell-type lithium secondary battery was subjected to a cycle of constant current-constant voltage charge up to 4.25 V and constant current discharge to 2.5 V at 0.1 C at 45° C. with resting for 20 minutes between charge and discharge, and then the formation capacity and the charge/discharge capacity were measured.

(2) Measurement of the Amount of Cumulative Gas Generation According to the Accumulation of Charge/Discharge After the lithium secondary battery was operated under the charge/discharge conditions of above (1), the pouch cell at the time of measuring the amount of gas generation was temporarily recovered in the discharged state. Using a hydrometer (MATSUHAKU, TWD-150DM), a difference between the original weight of the pouch cell and the weight thereof in water was measured to calculate a change in volume in the pouch cell, and the change in volume was divided by a weight of the electrode active material so as to calculate the amount of gas generation per weight.

The following table 2 shows the amount of cumulative gas generation after the $1^{st}$, $2^{nd}$, $10^{th}$, $30^{th}$ and $50^{th}$ cumulative cycles after formation ($0^{th}$ charge/discharge).

TABLE 2

| | Formation | | | | | | |
|---|---|---|---|---|---|---|---|
| | Capacity | Amount of gas generation | Amount of cumulative gas generation (mL/g) | | | | |
| | (mAh/g) | (mL/g) | 1st | 2nd | 10th | 30th | 50th |
| Example 1 ($Li_6Co_{0.7}Zn_{0.3}O_4$) | 795.2 | 103.6 | 0.02 | 0.12 | 0.34 | 0.64 | 0.76 |
| Example 2 ($Li_6Co_{0.7}Mg_{0.3}O_4$) | 846.4 | 106.6 | 0.40 | 0.64 | 2.50 | 5.55 | 6.02 |
| Example 3 ($Li_6Co_{0.7}Al_{0.3}O_4$) | 837.8 | 109.3 | 0.68 | 1.20 | 3.25 | 5.23 | 6.13 |
| Comparative Example 1 ($Li_6CoO_4$) | 903.0 | 129.1 | 5.92 | 6.91 | 8.04 | 9.17 | 10.10 |
| Example 9 ($Li_6Co_{0.7}Zn_{0.3}O_4$) | 783.2 | 101.4 | 0.05 | 0.15 | 0.37 | 0.69 | 0.82 |
| Example 10 ($Li_6Co_{0.7}Zn_{0.3}O_4$) | 800.1 | 104.1 | 0.03 | 0.14 | 0.35 | 0.62 | 0.74 |
| Example 11 ($Li_6Co_{0.7}Zn_{0.3}O_4$) | 803.4 | 105.2 | 0.04 | 0.11 | 0.27 | 0.56 | 0.61 |
| Comparative Example 5 ($Li_6Co_{0.7}Zn_{0.3}O_4$) | 756.2 | 98.2 | 0.03 | 0.13 | 0.31 | 0.59 | 0.67 |
| Comparative Example 6 ($Li_6Co_{0.7}Zn_{0.3}O_4$) | 739.2 | 95.1 | 0.07 | 0.19 | 0.42 | 0.73 | 0.95 |
| Comparative Example 7 ($Li_6Co_{0.7}Zn_{0.3}O_4$) | 731.4 | 93.0 | 0.05 | 0.23 | 0.45 | 0.78 | 1.02 |

As shown in above table 2 and FIG. 1, the formation capacity of Comparative Example 1 was the most excellent as 903.0 mAh/g, but continuous gas generation was observed, and the amount of cumulative gas generation after the $50^{th}$ cycle was 10 mL/g or more, which was much more than Examples 1 to 3. Accordingly, it can be seen that, in Comparative Example 1, the actual expression of the charge capacity of $Li_6CoO_4$ is mixed with the charge capacity caused by a side reaction with the electrolyte during the continuous charge and discharge, and thus it can be understood that an electrolyte oxidation reaction occurs to generate electrolyte decomposition gas.

In contrast, with respect to Examples 1 to 3, it was found that the formation capacity was smaller than that of Comparative Example 1, but the amount of cumulative gas generation in the $50^{th}$ cycle was also smaller than that of Comparative Example 1. In particular, although Example 1 was a hetero-element having the same molar ratio as in Examples 2 and 3, the amount of cumulative gas generation was 0.76 mL/g, thus showing a much more excellent effect of reducing the amount of gas generation compared to the amount of gas generation in Examples 2 and 3, which was 6.02 mL/g and 6.13 mL/g, respectively. Accordingly, it can be understood that the lithium cobalt oxide alloyed with Zn among the lithium cobalt oxides alloyed with a hetero-element effectively stabilizes a crystal phase, thereby reducing gas generation caused by a side reaction with an electrolyte.

In the case of Example 9 in which the calcination time was reduced to 6 hours, the formation capacity was lower than that of Example 1 due to somewhat insufficient crystallinity compared to Example 1 in which the calcination time was 12 hours, and it seems that the amount of cumulative gas generation in the $50^{th}$ cycle is relatively high.

In the case of Example 10 in which the calcination time was increased to 18 hours and Example 11 in which the calcination temperature was increased to 700° C., it was found that the formation capacity was larger than that of Example 1 and the amount of cumulative gas generation in the $50^{th}$ cycle was low. This may be considered to be caused by the increase in crystallinity with an increase in the calcination time or calcination temperature.

In the case of Comparative Example 5, it was found that crystal growth excessively occurred and the size of grains increased as the heating time increased, and thus the formation capacity was somewhat lower than that of Example 1 due to a decrease in the specific surface area. In contrast, in the case of Comparative Examples 6 and 7 in which the heating time was shortened, it seems that the size of grains became small, but the formation capacity was lowered due to a decrease in crystallinity. In addition, in the case of Comparative Examples 6 and 7, it seems that the amount of cumulative gas generation after the $50^{th}$ cycle slightly increased compared to Example 1 due to instability caused by the decrease in crystallinity.

Test Example 3

An experiment was conducted to confirm the amount of cumulative gas generation according to the initial charge capacity and the cumulative charge/discharge capacity of the lithium secondary battery, which varied depending on how much Zn, one of the hetero-elements, was introduced into $Li_6CoO_4$. In addition, an experiment was conducted to confirm the amount of cumulative gas generation according to high-temperature storage after formation.

With respect to the lithium secondary batteries of Examples 1 and 4 to 7 and Comparative Example 1, the amount of cumulative gas generation according to the accumulation of charge/discharge cycles was measured by the following method, and the amount of gas generation according to the measured cumulative charge capacity is shown in table 3 and the graph of FIG. 2. The amount of cumulative gas generation according to the high-temperature storage time is shown in table 4.

(1) Measurement of Formation (Initial Charge) Capacity and Charge/Discharge Capacity A pouch cell-type lithium secondary battery was subjected to a cycle of constant current-constant voltage charge up to 4.25 V and constant current discharge to 2.5 V at 0.1 C at a temperature of 45° C. with resting for 20 minutes between charge and discharge, and then the formation capacity and charge/discharge capacity were measured.

(2) Measurement of the Amount of Cumulative Gas Generation According to the Accumulation of Charge/Discharge After the lithium secondary battery was operated under the charge/discharge conditions of above (1), the pouch cell at the time of measuring the amount of gas generation was temporarily recovered in the discharged state. Using a hydrometer (MATSUHAKU, TWD-150DM), a difference between the original weight of the pouch cell and the weight thereof in water was measured to calculate a change in volume in the pouch cell, and the change in volume was divided by a weight of the electrode active material so as to calculate the amount of gas generation per weight.

(3) Measurement of the Amount of Cumulative Gas Generation According to High-Temperature Storage A pouch cell-type lithium secondary battery was subjected to a constant current-constant voltage charge up to 4.25 V at 0.1 C at a temperature of 45° C., collected to measure the formation capacity, and then stored in a 60° C. chamber. The lithium secondary battery was taken out at an interval of one week to measure a difference between the original weight of the pouch cell and the weight thereof in water by using a hydrometer (MATSUHAKU, TWD-150DM) and to calculate a change in volume in the pouch cell, after which the change in volume was divided by a weight of the electrode active material to calculate the amount of gas generation per weight.

The following table 3 shows the amount of cumulative gas generation after the $1^{st}$, $2^{nd}$, $10^{th}$, $30^{th}$ and $50^{th}$ cumulative cycles after formation ($0^{th}$ charge/discharge).

TABLE 3

| | Formation | | Amount of cumulative gas generation (mL/g) | | | | |
|---|---|---|---|---|---|---|---|
| | Capacity (mAh/g) | Amount of gas generation (mL/g) | 1st | 2nd | 10th | 30th | 50th |
| Example 1 ($Li_6Co_{0.7}Zn_{0.3}O_4$) | 795.2 | 103.6 | 0.02 | 0.12 | 0.34 | 0.64 | 0.76 |
| Example 4 ($Li_6Co_{0.9}Zn_{0.1}O_4$) | 842.1 | 108.1 | 0.53 | 0.76 | 3.15 | 5.07 | 5.44 |
| Example 5 ($Li_6Co_{0.8}Zn_{0.2}O_4$) | 827.9 | 105.0 | −0.16 | −0.19 | 0.44 | 1.68 | 2.11 |
| Example 6 ($Li_6Co_{0.6}Zn_{0.4}O_4$) | 756.6 | 99.1 | −0.14 | −0.22 | 0.00 | −0.07 | −0.18 |
| Example 7 ($Li_6Co_{0.5}Zn_{0.5}O_4$) | 692.3 | 85.3 | 0.41 | 0.25 | 0.16 | 0.06 | 0.14 |
| Comparative Example 1 ($Li_6CoO_4$) | 903.0 | 129.1 | 5.92 | 6.91 | 8.04 | 9.17 | 10.10 |

As shown in above table 3 and FIG. 2, it can be seen that the formation capacity and the amount of gas generation decreased as the Zn content in $Li_6CoO_4$ increased. This may be because the oxidation number of Zn does not change in $Zn^{2+}$, and thus Zn does not contribute to the charge capacity, unlike Co, which is oxidized from $Co^{2+}$ to $CO^{4+}$ during initial charge as Zn is substituted at Co sites in $Li_6CoO_4$.

In Example 1, the amount of cumulative gas generation after the $50^{th}$ cycle was 0.76 mL/g, which is within 1 mL/g. In the case of Examples 6 and 7, the amount of gas generation was smaller than that of Example 1, but the initial charge capacity was decreased. Example 1 may be considered to be the most excellent when comprehensively considered in terms of initial charge capacity, amount of cumulative gas generation after $50^{th}$ cycle, and electrical conductivity of grains.

In the case of Example 6, the amount of gas generation was a negative value of −0.18 mL/g, which may be an experimental error of the hydrometer, thus meaning that gas generation hardly occurred. In other words, it can be seen that Example 6 is more excellent than Example 1 in terms of reducing gas generation.

The following table 4 shows the amount of cumulative gas generation after 1, 2, 3 and 4 weeks after storage at 60° C. after formation ($0^{th}$ charge/discharge).

TABLE 4

| | Amount of cumulative gas generation (mL/g) | | | |
|---|---|---|---|---|
| | Week 1 | Week 2 | Week 3 | Week 4 |
| Example 1 ($Li_6Co_{0.7}Zn_{0.3}O_4$) | −0.16 | 0.13 | 0.17 | 0.37 |
| Example 4 ($Li_6Co_{0.9}Zn_{0.1}O_4$) | 1.44 | 1.75 | 2.02 | 2.04 |
| Example 5 ($Li_6Co_{0.8}Zn_{0.2}O_4$) | −0.15 | −0.12 | 0.50 | 1.04 |
| Example 6 ($Li_6Co_{0.6}Zn_{0.4}O_4$) | −0.56 | −0.36 | −0.23 | 0.39 |
| Example 7 ($Li_6Co_{0.5}Zn_{0.5}O_4$) | −0.60 | −0.16 | −0.11 | 0.10 |
| Comparative Example 1 ($Li_6CoO_4$) | 9.95 | 10.19 | 9.70 | 9.56 |

As shown in above table 4, it can be seen that the amount of cumulative gas generation decreased during the high-temperature storage at 60° C. as the Zn content in $Li_6CoO_4$ increased.

In particular, it was confirmed that Example 4 showed the amount of cumulative gas generation of 2.04 mL/g at week 4, which is a 78.6% decrease against Comparative Example 1. In Example 1, the amount of cumulative gas generation after four weeks was 0.37 mL/g, which is within 1 mL/g. Examples 6 and 7 also exhibited an excellent effect of reducing gas.

Test Example 4

With respect to the lithium secondary batteries of Example 8 and Comparative Examples 2 to 4 in which the positive electrode active material and the positive electrode additive are mixed and applied, the capacity cycle retention and the amount of cumulative gas generation according to the accumulation of charge/discharge cycles were measured by the following method, and the measured capacity retention and the amount of cumulative gas generation are shown in the graph of FIG. 3 and table 5.

(1) Measurement of Formation (Initial Charge) Capacity and Charge/Discharge Capacity A pouch cell-type lithium secondary battery was subjected to a cycle of constant current-constant voltage charge up to 4.25 V and constant current discharge to 2.5 V at 0.1 C at a temperature of 45° C. with resting for 20 minutes between charge and discharge, and then the formation capacity and charge/discharge capacity up to $100^{th}$ cycle were measured.

(2) Measurement of the Amount of Cumulative Gas Generation According to the Accumulation of Charge/Discharge After the lithium secondary battery was operated under the charge/discharge conditions of above (1), the pouch cell at the time of measuring the amount of gas generation was temporarily recovered in the discharged state. Using a hydrometer (MATSUHAKU, TWD-150DM), a difference between the original weight of the pouch cell and the weight thereof in water was measured to calculate a change in volume in the pouch cell, and the change in volume was divided by a weight of the electrode active material so as to calculate the amount of gas generation per weight.

(3) Measurement of the Amount of Cumulative Gas Generation According to High-Temperature Storage A pouch cell-type lithium secondary battery was subjected to a constant current-constant voltage charge up to 4.25 V at 0.1 C at a temperature of 45° C., collected to measure the formation capacity, and then stored in a 60° C. chamber. The lithium secondary battery was taken out at an interval of one week to measure a difference between the original weight of the pouch cell and the weight thereof in water by using a hydrometer (MATSUHAKU, TWD-150DM) and to calculate a change in volume in the pouch cell, after which the change in volume was divided by a weight of the electrode active material to calculate the amount of gas generation per weight.

The following table 5 shows the formation ($0^{th}$ charge/discharge) capacity, the amount of cumulative gas generation after the $50^{th}$ and $100^{th}$ cumulative cycles, and the discharge capacity retention after the $100^{th}$ cycle.

TABLE 5

| | Formation capacity (mAh/g) | | Amount of gas generation (mL/g) | | Capacity retention |
|---|---|---|---|---|---|
| | Charge capacity | Discharge capacity | 50th | 100th | @ 100th cycle |
| Example 8 (NCMA + $Li_6Co_{0.7}Zn_{0.3}O_4$) | 243.4 | 214.9 | 0.14 | 0.16 | 88.2 |
| Comparative Example 2 (NCMA + $Li_6CoO_4$) | 243.3 | 215.4 | 0.03 | 0.24 | 88.2 |
| Comparative Example 3 (NCMA + DN20) | 242.2 | 214.5 | 0.02 | 0.11 | 86.3 |
| Comparative Example 4 (NCMA) | 236.0 | 201.3 | 0.10 | 0.20 | 86.2 |

As shown in above table 5 and FIG. 3, the discharge capacities of Example 8 and Comparative Examples 2 and 3 were 214.9 mAh/g, 215.4 mAh/g, and 214.5 mAh/g, respectively, which were larger than Comparative Example 4 in which the sacrificial positive electrode material was not applied. It can be seen that the sacrificial positive electrode material compensates for the irreversible lithium consumed in the formation of the SEI layer at the negative electrode.

In contrast, in the case of Comparative Example 4, there was no sacrificial positive electrode material to compensate for irreversible lithium, and thus lithium of the positive electrode material was consumed, resulting in a decrease in the discharge capacity and indicating a discharge capacity of 201.3 mAh/g.

In the case of Example 8, the amount of cumulative gas generation at the $100^{th}$ cycle was 0.16 mL/g, which was less than 0.24 mL/g of Comparative Example 2 and less than 0.20 mL/g of Comparative Example 4 in which the sacrificial positive electrode material was not applied.

In the case of Comparative Example 3, the amount of cumulative gas generation at the $100^{th}$ cycle was the smallest as 0.11 mL/g, but the amount of increased gas generation from the $50^{th}$ cycle to the $100^{th}$ cycle was 0.09 mL/g, thus having a chance that the gas generation will continue to increase thereafter. This is also the same as in Comparative Example 2. In contrast, in the case of Example 8, the amount of increased gas generation from the $50^{th}$ cycle to the $100^{th}$ cycle was 0.02 mL/g, and thus it can be seen that the gas generation is suppressed as the charge/discharge cycle continues.

In the case of the capacity retention at $100^{th}$ cycle, both Example 8 and Comparative Example 2, to which the Co-based sacrificial positive electrode material was applied, were excellent as 88.2%. Comparative Example 3 to which the Ni-based sacrificial positive electrode material was applied and Comparative Example 4 to which the sacrificial positive electrode material was not applied showed the capacity retention of 86.3% and 86.2%, respectively, which were lower than those of Example 8 and Comparative Example 2.

Accordingly, when a Co-based sacrificial positive electrode material, in particular, a sacrificial positive electrode material alloyed with Zn is applied to a lithium secondary battery including an actual positive electrode material, it can be confirmed that the material preserves the initial discharge capacity and suppresses the amount of gas generation in the battery, and the capacity retention is also excellent after the $100^{th}$ cycle.

The following table 6 shows the amount of cumulative gas generation after one, two, three and four weeks after formation ($0^{th}$ charge) and storage at 72° C.

TABLE 6

| | Amount of cumulative gas generation (mL/g) | | | |
|---|---|---|---|---|
| | Week 1 | Week 2 | Week 3 | Week 4 |
| Example 8 (NCMA + $Li_6Co_{0.7}Zn_{0.3}O_4$) | 0.11 | 0.14 | 0.18 | 0.22 |
| Comparative Example 2 (NCMA + $Li_6CoO_4$) | 1.07 | 1.38 | 1.78 | 2.01 |
| Comparative Example 3 (NCMA + DN20) | 0.54 | 0.65 | 0.80 | 0.82 |
| Comparative Example 4 (NCMA) | 0.21 | 0.29 | 0.53 | 0.55 |

As shown in above table 6, Example 8 showed the lowest amount of cumulative gas generation of 0.22 mL/g after four weeks. This may be because, like the result of the charge/discharge cycle, the hetero-element introduced into $Li_6CoO_4$ effectively stabilizes $CoO_2$ formed after the initial charge so as to prevent a side reaction with an electrolyte, thereby suppressing additional gas generation.

In addition, Example 8 generated gas less than Comparative Example 4 in which the sacrificial positive electrode material was not applied, and this result may be an experimental error, or the positive electrode additive included in the lithium secondary battery is likely to not only suppress gas generation but also absorb the generated gas.

In the above, although the present invention has been described with reference to limited embodiments and drawings, the present invention is not limited thereto, and various modifications and variations are possible within the technical idea of the present invention and within the equivalent scope of the claims to be described below by those skilled in the art to which the present invention pertains.

The invention claimed is:

1. A lithium transition metal oxide represented by the following Chemical Formula 1, wherein a lattice parameter of a unit lattice satisfies the following Equations 1 and 2:

[Chemical Formula 1]

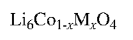

$Li_6Co_{1-x}M_xO_4$ wherein,

M is at least one element selected from the group consisting of Zn, Al and Mg, and x is 0.1 to 0.7;

$$6.53200\ \text{Å} \le a = b \le 6.54400\ \text{Å} \quad \text{[Equation 1]}$$

$$4.64930\ \text{Å} \le c \le 4.65330\ \text{Å} \quad \text{[Equation 2]}$$

in Equations 1 and 2, a, b and c are lattice parameters of the lithium transition metal oxide obtained by an XRD Rietveld refinement method using CuKα rays.

2. The lithium transition metal oxide of claim 1, wherein the lithium transition metal oxide has a unit lattice volume (V) of 198.350 Å$^3$ to 199.170 Å$^3$.

3. The lithium transition metal oxide of claim 1, wherein the lithium transition metal oxide is at least one compound selected from the group consisting of

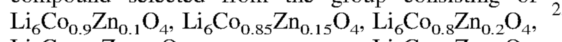
$Li_6Co_{0.9}Zn_{0.1}O_4$, $Li_6Co_{0.85}Zn_{0.15}O_4$, $Li_6Co_{0.8}Zn_{0.2}O_4$,
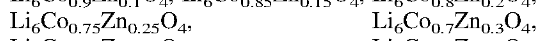
$Li_6Co_{0.75}Zn_{0.25}O_4$, $Li_6Co_{0.7}Zn_{0.3}O_4$,
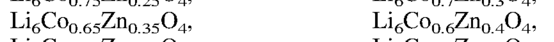
$Li_6Co_{0.65}Zn_{0.35}O_4$, $Li_6Co_{0.6}Zn_{0.4}O_4$,
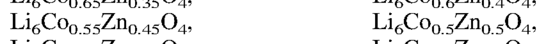
$Li_6Co_{0.55}Zn_{0.45}O_4$, $Li_6Co_{0.5}Zn_{0.5}O_4$,
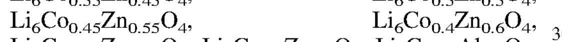
$Li_6Co_{0.45}Zn_{0.55}O_4$, $Li_6Co_{0.4}Zn_{0.6}O_4$,
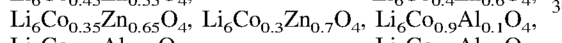
$Li_6Co_{0.35}Zn_{0.65}O_4$, $Li_6Co_{0.3}Zn_{0.7}O_4$, $Li_6Co_{0.9}Al_{0.1}O_4$,
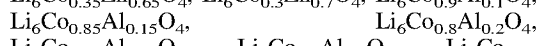
$Li_6Co_{0.85}Al_{0.15}O_4$, $Li_6Co_{0.8}Al_{0.2}O_4$,
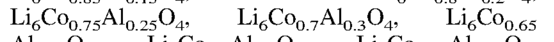
$Li_6Co_{0.75}Al_{0.25}O_4$, $Li_6Co_{0.7}Al_{0.3}O_4$, $Li_6Co_{0.65}$
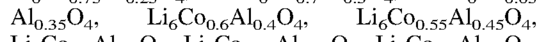
$Al_{0.35}O_4$, $Li_6Co_{0.6}Al_{0.4}O_4$, $Li_6Co_{0.55}Al_{0.45}O_4$,
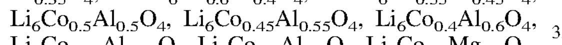
$Li_6Co_{0.5}Al_{0.5}O_4$, $Li_6Co_{0.45}Al_{0.55}O_4$, $Li_6Co_{0.4}Al_{0.6}O_4$,
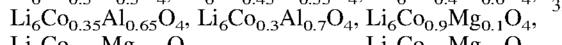
$Li_6Co_{0.35}Al_{0.65}O_4$, $Li_6Co_{0.3}Al_{0.7}O_4$, $Li_6Co_{0.9}Mg_{0.1}O_4$,
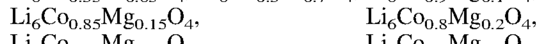
$Li_6Co_{0.85}Mg_{0.15}O_4$, $Li_6Co_{0.8}Mg_{0.2}O_4$,
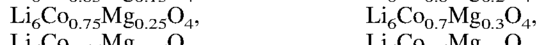
$Li_6Co_{0.75}Mg_{0.25}O_4$, $Li_6Co_{0.7}Mg_{0.3}O_4$,
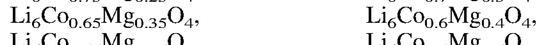
$Li_6Co_{0.65}Mg_{0.35}O_4$, $Li_6Co_{0.6}Mg_{0.4}O_4$,
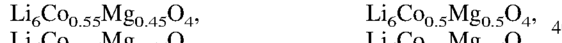
$Li_6Co_{0.55}Mg_{0.45}O_4$, $Li_6Co_{0.5}Mg_{0.5}O_4$,
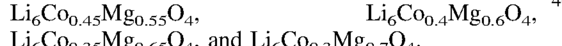
$Li_6Co_{0.45}Mg_{0.55}O_4$, $Li_6Co_{0.4}Mg_{0.6}O_4$,
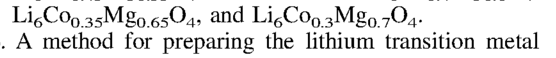
$Li_6Co_{0.35}Mg_{0.65}O_4$, and $Li_6Co_{0.3}Mg_{0.7}O_4$.

4. A method for preparing the lithium transition metal oxide of claim 1, comprising:

a first step of obtaining a raw material mixture by solid-state mixing of lithium oxide, cobalt oxide and hetero-element (M) oxide to form a mixture; and a second step of obtaining a compound represented by the following Chemical Formula 1 by calcining the mixture obtained in the first step under an inert atmosphere and at a temperature of 550° C. to 750° C.:

[Chemical Formula 1]

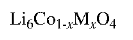

$Li_6Co_{1-x}M_xO_4$ wherein,

M is at least one element selected from the group consisting of Zn, Al and Mg, x is 0.1 to 0.7.

5. The method for preparing the lithium transition metal oxide of claim 4, wherein in the second step, the mixture obtained in the first step is heated at a heating rate of 1.4° C./min to 2.0° C./min under an inert atmosphere to perform calcination at a temperature of 550° C. to 750° C. for 2 to 20 hours.

6. A positive electrode additive for a lithium secondary battery, comprising a lithium transition metal oxide represented by the following Chemical Formula 1, wherein a lattice parameter of a unit lattice satisfies the following Equations 1 and 2:

[Chemical Formula 1]

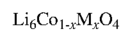

$Li_6Co_{1-x}M_xO_4$ wherein,

M is at least one element selected from the group consisting of Zn, Al and Mg, and x is 0.1 to 0.7;

$$6.53200\ \text{Å} \le a = b \le 6.54400\ \text{Å} \quad \text{[Equation 1]}$$

$$4.64930\ \text{Å} \le c \le 4.65330\ \text{Å} \quad \text{[Equation 2]}$$

in Equations 1 and 2, a, b and c are lattice parameters of the lithium transition metal oxide obtained by an XRD Rietveld refinement method using CuKα rays.

7. The positive electrode additive for the lithium secondary battery of claim 6, wherein the lithium transition metal oxide has a unit lattice volume (V) of 198.350 Å$^3$ to 199.170 Å$^3$.

8. The positive electrode additive for the lithium secondary battery of claim 6, wherein the lithium transition metal oxide is at least one compound selected from the group consisting of

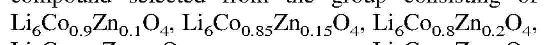
$Li_6Co_{0.9}Zn_{0.1}O_4$, $Li_6Co_{0.85}Zn_{0.15}O_4$, $Li_6Co_{0.8}Zn_{0.2}O_4$,
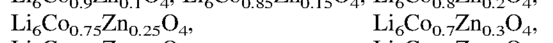
$Li_6Co_{0.75}Zn_{0.25}O_4$, $Li_6Co_{0.7}Zn_{0.3}O_4$,
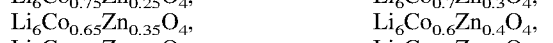
$Li_6Co_{0.65}Zn_{0.35}O_4$, $Li_6Co_{0.6}Zn_{0.4}O_4$,
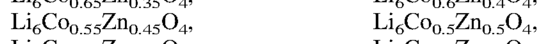
$Li_6Co_{0.55}Zn_{0.45}O_4$, $Li_6Co_{0.5}Zn_{0.5}O_4$,
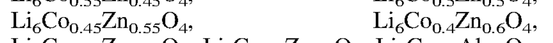
$Li_6Co_{0.45}Zn_{0.55}O_4$, $Li_6Co_{0.4}Zn_{0.6}O_4$,
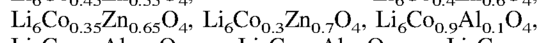
$Li_6Co_{0.35}Zn_{0.65}O_4$, $Li_6Co_{0.3}Zn_{0.7}O_4$, $Li_6Co_{0.9}Al_{0.1}O_4$,
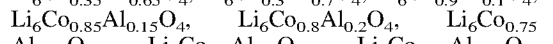
$Li_6Co_{0.85}Al_{0.15}O_4$, $Li_6Co_{0.8}Al_{0.2}O_4$, $Li_6Co_{0.75}$
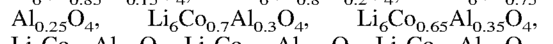
$Al_{0.25}O_4$, $Li_6Co_{0.7}Al_{0.3}O_4$, $Li_6Co_{0.65}Al_{0.35}O_4$,
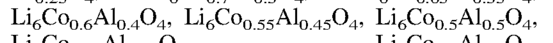
$Li_6Co_{0.6}Al_{0.4}O_4$, $Li_6Co_{0.55}Al_{0.45}O_4$, $Li_6Co_{0.5}Al_{0.5}O_4$,
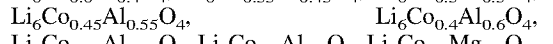
$Li_6Co_{0.45}Al_{0.55}O_4$, $Li_6Co_{0.4}Al_{0.6}O_4$,
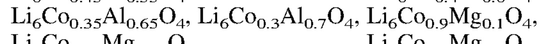
$Li_6Co_{0.35}Al_{0.65}O_4$, $Li_6Co_{0.3}Al_{0.7}O_4$, $Li_6Co_{0.9}Mg_{0.1}O_4$,
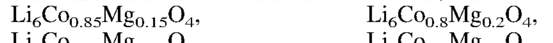
$Li_6Co_{0.85}Mg_{0.15}O_4$, $Li_6Co_{0.8}Mg_{0.2}O_4$,
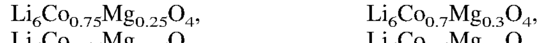
$Li_6Co_{0.75}Mg_{0.25}O_4$, $Li_6Co_{0.7}Mg_{0.3}O_4$,
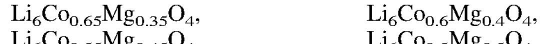
$Li_6Co_{0.65}Mg_{0.35}O_4$, $Li_6Co_{0.6}Mg_{0.4}O_4$,
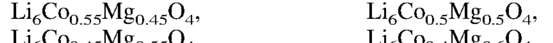
$Li_6Co_{0.55}Mg_{0.45}O_4$, $Li_6Co_{0.5}Mg_{0.5}O_4$,
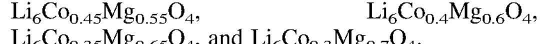
$Li_6Co_{0.45}Mg_{0.55}O_4$, $Li_6Co_{0.4}Mg_{0.6}O_4$,
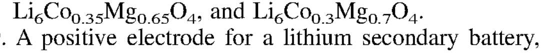
$Li_6Co_{0.35}Mg_{0.65}O_4$, and $Li_6Co_{0.3}Mg_{0.7}O_4$.

9. A positive electrode for a lithium secondary battery, comprising a positive electrode active material, a binder, a conductive material, and the lithium transition metal oxide of claim 1.

10. A positive electrode for a lithium secondary battery, comprising a positive electrode active material, a binder, a conductive material, and the positive electrode additive for the lithium secondary battery of claim 6.

11. A lithium secondary battery, comprising the positive electrode for the lithium secondary battery of claim 9; a negative electrode; a separator; and an electrolyte.

12. The lithium secondary battery of claim 11, wherein the negative electrode comprises at least one negative electrode active material selected from the group consisting of a carbonaceous material and a silicon compound.

13. A lithium secondary battery, comprising the positive electrode for the lithium secondary battery of claim 10; a negative electrode; a separator; and an electrolyte.

* * * * *